(12) United States Patent
Minagawa et al.

(10) Patent No.: US 10,253,182 B2
(45) Date of Patent: Apr. 9, 2019

(54) SEMI-AROMATIC POLYAMIDE RESIN COMPOSITION AND MOLDED ARTICLE OF SAME

(71) Applicant: MITSUI CHEMICALS, INC., Minato-ku, Tokyo (JP)

(72) Inventors: Kaoru Minagawa, Funabashi (JP); Hiroki Ebata, Yokohama (JP); Isao Washio, Chiba (JP); Kouichi Sano, Ichihara (JP); Nobuhiro Takizawa, Kamakura (JP); Akinori Amano, Sammu (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 328 days.

(21) Appl. No.: 15/104,626

(22) PCT Filed: Dec. 19, 2014

(86) PCT No.: PCT/JP2014/006356
§ 371 (c)(1),
(2) Date: Jun. 15, 2016

(87) PCT Pub. No.: WO2015/093060
PCT Pub. Date: Jun. 25, 2015

(65) Prior Publication Data
US 2016/0312027 A1  Oct. 27, 2016

(30) Foreign Application Priority Data
Dec. 20, 2013 (JP) ................. 2013-264388

(51) Int. Cl.
C08L 77/06 (2006.01)
C08G 69/26 (2006.01)
C08K 7/14 (2006.01)
C08L 51/06 (2006.01)

(52) U.S. Cl.
CPC ............ *C08L 77/06* (2013.01); *C08G 69/265* (2013.01); *C08K 7/14* (2013.01); *C08L 51/06* (2013.01); *C08L 2201/08* (2013.01); *C08L 2205/06* (2013.01)

(58) Field of Classification Search
CPC ...... C08L 77/06; C08L 51/06; C08L 2201/08; C08L 2205/06; C08G 69/265; C08K 7/14
USPC ........................................................ 524/504
See application file for complete search history.

(56) References Cited

U.S. PATENT DOCUMENTS

2009/0098325 A1   4/2009  Uchida et al.

FOREIGN PATENT DOCUMENTS

| EP | 1237628 A1 | 1/2003 | |
|---|---|---|---|
| EP | 1273628 A1 * | 1/2003 | ............. C08G 69/02 |
| EP | 1860134 A1 * | 11/2007 | ................ B32B 1/08 |
| EP | 1860134 A1 | 11/2007 | |
| JP | 2-251557 A | 10/1990 | |
| JP | H03-160435 A | 7/1991 | |
| JP | H05-050568 A | 3/1993 | |
| JP | H09-080694 A | 3/1997 | |
| JP | H10-310697 A | 11/1998 | |
| JP | 2000-129122 A | 5/2000 | |
| JP | 2002-20619 A | 1/2002 | |
| JP | 2003-082023 A | 3/2003 | |
| JP | 2005-298578 A | 10/2005 | |
| JP | 2006-152256 A | 6/2006 | |
| JP | 2006-176597 A | 7/2006 | |
| JP | 2008-179753 A | 8/2008 | |
| JP | 2013/40346 A | 2/2013 | |
| WO | 00/24830 A1 | 5/2000 | |
| WO | WO 03/085029 A1 | 10/2003 | |
| WO | 2006/098434 A1 | 9/2006 | |
| WO | WO 2015/011935 A1 | 1/2015 | |

OTHER PUBLICATIONS

D. J. Kemmish, "Practical Guide to High Performance Engineering Plastics", Ch.3—Semi-Aromatic Polyamides (Polyphthalamides), Smithers Group, Shawbury, United Kingdom, 2011, pp. 47-55.—www.smithersrapra.com (Year: 2011).*
AsahiKasei, TuftecTM—Hydrogenated Styrenic Thermoplastic Elastomer (SEBS) brochure—www.chemwinfo.com/private_folder/Uploeadfiles2015_July/Asahi_Kasie_SEBS_Brochure.pdf (Year: 2015).*
Kuraray, "High Performance Polyamide, GenestarTM PA9T"—www.kuraray.eu/fileadmin/presse/publikationen/downloads_k_fair_2013/genestar/GENESTAR_Auto.pdf. (Year: 2013).*
Extended Search Report issued by the European Patent Office in corresponding European Patent Application No. 14872641.7 dated Jul. 14, 2017 (5 pages).
International Search Report (PCT/ISA/210) dated Mar. 31, 2015, by the Japanese Patent Office as the International Searching Authority for International Application No. PCT/JP2014/006356.

* cited by examiner

*Primary Examiner* — Ling Siu Choi
*Assistant Examiner* — Ronald Grinsted
(74) *Attorney, Agent, or Firm* — Buchanan, Ingersoll & Rooney PC

(57) ABSTRACT

The problem of the invention is to provide a semi-aromatic polyamide resin composition having high rigidity, exceptional impact resistance, and exceptional zygosity with very little change in hardness associated with heating and cooling, as well as a molded article of this semi-aromatic polyamide resin composition. A semi-aromatic polyamide resin composition containing a semi-aromatic polyamide resin (A), acid-modified polyolefin resin (B), and fibrous filler (C), wherein the resin (A) contains a certain amount or more of terephthalic acid component units relative to the total number of moles of dicarboxylic acid component units, the semi-aromatic polyamide resin composition contains a certain amount or more of the resin (B), the glass transition temperature of the semi-aromatic polyamide resin composition is within a predetermined range, and the Vicat softening point of the resin (B) is within a predetermined range, is used as the semi-aromatic polyamide resin composition in order to solve this problem.

13 Claims, 2 Drawing Sheets

SEMI-AROMATIC POLYAMIDE RESIN COMPOSITION AND MOLDED ARTICLE OF SAME

TECHNICAL FIELD

The present invention relates to a semi-aromatic polyamide resin composition having high rigidity, impact resistance, and excellent joint properties with extremely small change in hardness caused by heating or cooling; and a molded product thereof.

BACKGROUND ART

A polyamide typically represented by nylon 6 and nylon 66 is excellent in moldability, mechanical properties and chemical resistance, and widely used as a material for various parts of automobiles, industrial materials, clothing, and electric, electronic or industrial applications.

A polyamide is frequently used particularly as automotive parts such as parts related to a basic engine, e.g., engine covers, connectors to be directly connected to the cover, and air intake manifolds, relay boxes, gears, and clips.

In recent years, resulting from the downsizing of an engine compartment of automobiles and enhancing the performance or power output of an engine, the temperature in the engine compartment and the temperature of engine cooling water tend to increase. Accordingly, a resin product for use is required to have further higher heat resistance. In other words, a polyamide having excellent heat resistance even higher than nylon 66 is required.

Further, replacement of metal parts with resins is underway, so that resin materials are required to have higher rigidity and impact resistance (e.g., toughness) than ever. Furthermore, the resin parts are required to have excellent joint (welding) properties to each other. The requirements for the parts constituting an engine or a motor (including battery materials), in particular, are increasing in combination with needs for improvement in fuel efficiency through weight saving.

Herein, various studies have been conducted on, as a material for replacing metal, semi-aromatic polyamides including nylon 6T, which have excellent heat resistance and high rigidity (PTL 1).

CITATION LIST

Patent Literature

PTL 1
Japanese Patent Application Laid-Open No. 2006-176597

SUMMARY OF INVENTION

Technical Problem

Semi-aromatic polyamides have a high melting point and high crystallinity. This results in difficulty in welding to other resin members and less resistance to a heat shock stress caused by repeated heating and cooling, in comparison with nylon 6 and nylon 66. Consequently a junction failure easily occurs therebetween. In other words, semi-aromatic polyamides including nylon 6T have insufficient long-term reliability in use for engine peripheral parts or the like.

Further, as a result of extensive studies on semi-aromatic polyamides excellent in heat resistance by the present inventors, it has been found that compositions including a semi-aromatic polyamide and a typical polyolefin resin tend to have poor resistance to a heat shock stress, in particular. It has also been found that members containing a semi-aromatic polyamide and a polyolefin resin allow the hardness to be easily changed by a heat shock, resulting in a junction failure with other resin members. In other words, a conventional semi-aromatic polyamide resin or a resin composition containing the same has difficulty in firmly joining with various resin members and is incapable of satisfying all of high rigidity, impact resistance, and heat shock resistance at the same time.

An object of the present invention is to provide a semi-aromatic polyamide resin composition having high rigidity, excellent impact resistance, and excellent joint properties with extremely small change in hardness caused by heating or cooling; and a molded product thereof.

Solution to Problem

As a result of extensive studies by the present inventors, it has been found that a semi-aromatic polyamide resin composition having a specified composition and a molded product thereof can achieve the object, and the present invention has been accomplished.

A first aspect of the present invention relates to semi-aromatic polyamide resin compositions as set forth below.

[1] A semi-aromatic polyamide resin composition containing:

a semi-aromatic polyamide resin (A) constituted from a dicarboxylic acid component unit and an aliphatic diamine component unit; an acid-modified polyolefin resin (B); and a fibrous filler (C); wherein the semi-aromatic polyamide resin (A) contains 60 mol % or more of a terephthalic acid component unit relative to a total number of moles of the dicarboxylic acid component unit; the acid-modified polyolefin resin (B) is contained in an amount of 1.0 to 23 parts by mass relative to 100 parts by mass of a total of the semi-aromatic polyamide resin (A), the acid-modified polyolefin resin (B), and the fibrous filler (C); the semi-aromatic polyamide resin composition satisfies below requirement (1); and the acid-modified polyolefin resin (B) satisfies below requirement (2):

(1) a glass transition temperature derived from the semi-aromatic polyamide resin (A) measured by DSC is in the range of 90° C. to 180° C.; and (2) a Vicat softening point measured in accordance with ASTM D1525 is in the range of 45° C. to 110° C.

[2] The semi-aromatic polyamide resin composition according to [1], wherein a ratio between frictional force T(23) at 23° C. and frictional force T(90) at 90° C., i.e. (T(90)/T(23)), measured by a lateral force microscope (LFM) is 5 or less.

[3] The semi-aromatic polyamide resin composition according to [1] or [2], wherein the acid-modified polyolefin resin (B) is an olefin polymer modified with an unsaturated carboxylic acid or a derivative thereof; and a total number of moles (MA) of terminal amino groups of the semi-aromatic polyamide resin (A) and a total number of moles (MB) of acid groups and derivative groups thereof in the acid-modified polyolefin resin (B) contained in the semi-aromatic polyamide resin composition satisfy below requirement (3):

$$(MA-MB) \geq 3.0. \qquad (3)$$

[4] The semi-aromatic polyamide resin composition according to any one of [1] to [3], wherein the acid-modified polyolefin resin (B) has the Vicat softening point measured in accordance with ASTM D1525 in the range of 90° C. to 110° C.

[5] The semi-aromatic polyamide resin composition according to any one of [1] to [4], wherein the aliphatic diamine component unit of the semi-aromatic polyamide resin (A) satisfies at least one of below requirements (a1) and (a2):

(a1) a content of a straight-chain alkylene diamine component unit having 4 to 18 carbon atoms relative to a total number of moles of the aliphatic diamine component unit is 40 to 90 mol %;

(a2) a content of a side-chain alkylene diamine component unit having 4 to 18 carbon atoms relative to the total number of moles of the aliphatic diamine component unit is 10 to 60 mol %.

[6] The semi-aromatic polyamide resin composition according to [5], wherein the side-chain alkylene diamine component unit contains at least one of a 2-methyl-1,8-octanediamine component unit and a 2-methyl-1,5-pentanediamine component unit.

[7] The semi-aromatic polyamide resin composition according to [5] or [6], wherein the straight-chain alkylene diamine component unit contains a 1,6-diaminohexane component unit; and the side-chain alkylene diamine component unit contains a 2-methyl-1,5-pentanediamine component unit.

[8] The semi-aromatic polyamide resin composition according to [7], wherein the aliphatic diamine component unit contains more than 45 mol % and less than 55 mol % of a 1,6-diaminohexane component unit and more than 45 mol % and less than 55 mol % of a 2-methyl-1,5-pentanediamine component unit.

[9] The semi-aromatic polyamide resin composition according to [5], wherein the straight-chain alkylene diamine component unit contains a 1,9-nonanediamine component unit, and the side-chain alkylene diamine component unit contains a 2-methyl-1,8-octanediamine component unit.

[10] The semi-aromatic polyamide resin composition according to any one of [1] to [9], wherein the dicarboxylic acid component unit of the semi-aromatic polyamide resin (A) further contains the isophthalic acid component unit; and the aliphatic diamine component unit of the semi-aromatic polyamide resin (A) has 4 to 15 carbon atoms.

[11] The semi-aromatic polyamide resin composition according to [10], wherein the dicarboxylic acid component unit of the semi-aromatic polyamide resin (A) further contains the isophthalic acid component unit and a molar ratio between the terephthalic acid component unit and the isophthalic acid component unit is 60/40 to 99.9/0.1; and the aliphatic diamine component unit contains more than 45 mol % and less than 55 mol % of a 1,6-diaminohexane component unit and more than 45 mol % and less than 55 mol % of a 2-methyl-1,5-pentanediamine component unit.

[12] The semi-aromatic polyamide resin composition according to any one of [3] to [11], wherein the acid-modified polyolefin resin (B) satisfies below requirements (4) and (5):

(4) a graft amount of the unsaturated carboxylic acid or the derivative thereof is 0.01 to 1.5 mass %; and (5) a density measured in accordance with JIS K7112 is in the range of 890 to 940 kg/m$^3$.

[13] The semi-aromatic polyamide resin composition according to any one of [1] to [12], wherein a content of the semi-aromatic polyamide resin (A) is 30 to 90 mass %; a content of the acid-modified polyolefin resin (B) is 1 to 20 mass %; and a content of the fibrous filler (C) is 5 to 60 mass %, wherein the total of the semi-aromatic polyamide resin (A), the acid-modified polyolefin resin (B), and the fibrous filler (C) is 100 mass %.

A second aspect of the present invention relates to the following molded product.

[14] A molded product containing the semi-aromatic polyamide resin composition according to any one of the items [1] to [13].

Advantageous Effects of Invention

Using the semi-aromatic polyamide resin composition of the present invention, various types of molded products having high rigidity, excellent impact resistance, and excellent joint properties with other resin members or the like, with extremely small change in hardness caused by heating or cooling can be obtained.

DESCRIPTION OF EMBODIMENTS

Figure 1:
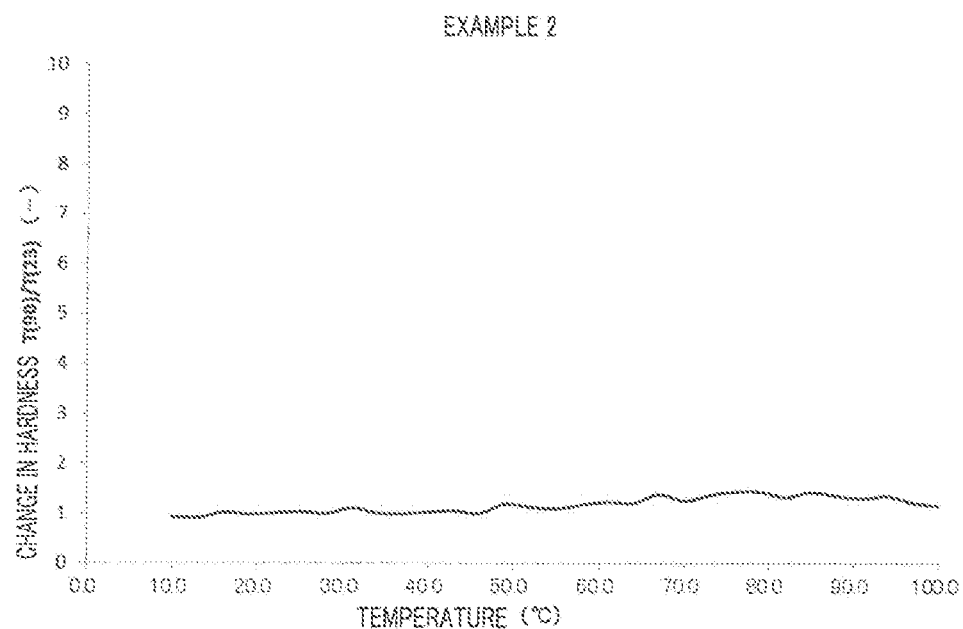
FIG. 1 is a chart showing the results in Example 2 measured by a lateral force microscope (LFM)

Although specific embodiments of the present invention are described in detail below, the present invention is not limited thereto and can be performed with a proper modification within the scope of the purpose of the present invention.

In the present specification, any numerical range using the term "to" means a range including the upper and lower limit values described across the term "to." In the present specification, the amount of the respective component means, when there are a plurality of materials corresponding to the component, the total amount of the materials present in the composition unless otherwise specified.

1. Semi-aromatic Polyamide Resin Composition

The semi-aromatic polyamide resin composition of the present invention (hereinafter also simply referred to as "resin composition") includes a semi-aromatic polyamide resin (A), an acid-modified polyolefin resin (B), and a fibrous filler (C).

As described above, the composition composed of a semi-aromatic polyamide resin only as the resin component has difficulty in welding to other compositions due to high crystallinity and the like of the polyamide resin. On the other hand, when a typical polyolefin resin is added to the semi-aromatic polyamide resin for enhancement of weldability, the hardness of the resultant molded product is readily changed due to softening and the like of the polyolefin resin and susceptible to the impact of heat shock.

In contrast, in the acid-modified polyolefin resin (B) of the resin composition of the present invention, a polyolefin resin has been acid modified. As a result, the compatibility between the semi-aromatic polyamide resin (A) and the acid-modified polyolefin resin (B) is excellent. In other words, since the relatively soft acid-modified polyolefin resin (B) is well dispersed in the semi-aromatic polyamide resin (A), the resin composition of the present invention has high weldability to other members. Further, the inclusion of a specified amount of the acid-modified polyolefin resin (B) enhances the impact resistance of the resin composition.

Meanwhile, since the acid-modified polyolefin resin (B) has a relatively high softening point, the hardness of a molded product obtained from the resin composition is hardly changed by temperature change. In other words, the resin composition has an increased heat shock resistance. Further, the acid-modified polyolefin resin (B) has high insulating properties. The acid-modified polyolefin resin (B) having a relatively high softening point allows the resin composition to maintain high insulating properties at a high temperature. In other words, the present invention provides a resin composition having high rigidity, impact resistance, excellent weldability to other members, high heat shock resistance, and high insulating properties at a high temperature.

1-1. Semi-Aromatic Polyamide Resin (A)

The semi-aromatic polyamide resin (A) contains a component derived from an aromatic carboxylic acid (terephthalic acid) and a component derived from an aliphatic diamine. The semi-aromatic polyamide resin (A) has a glass transition temperature (Tg) measured with a differential scanning calorimeter (DSC) of 90 to 180° C., preferably 110 to 150° C. The inclusion of the semi-aromatic polyamide resin (A) having a Tg in the range in the semi-aromatic polyamide resin (A) resin composition can enhance the mechanical strength of the resin composition.

Further, the semi-aromatic polyamide resin (A) has a melting point (Tm) measured by differential scanning calorimetry (DSC) of preferably 280 to 330° C., more preferably 290 to 330° C. The melting point of the semi-aromatic polyamide resin (A) being in the above-mentioned range allows a resin composition having even higher mechanical strength and moldability to be easily obtained. It is required, for example, to set a high molding temperature when molding a resin composition containing a semi-aromatic polyamide resin (A) having an excessively high melting point. This causes the acid-modified polyolefin resin (B) or the like being easily thermally decomposed to cause mold stains. In other words, the continuous moldability tends to decrease. In contrast, the semi-aromatic polyamide resin (A) having a melting point in the above-mentioned range allows a resin composition to be molded at a proper temperature. The glass transition temperature and the melting point of the semi-aromatic polyamide resin (A) can be adjusted by the type of the dicarboxylic acid component unit and the aliphatic diamine component unit constituting the semi-aromatic polyamide resin (A), the molecular weight of the semi-aromatic polyamide resin (A), and the like.

The melting point (Tm) and the glass transition temperature (Tg) of the semi-aromatic polyamide resin (A) are measured with a differential scanning calorimeter (e.g., DSC220C, manufactured by Seiko Instruments Inc.). Specifically, about 5 mg of the semi-aromatic polyamide resin (A) is sealed in a measurement aluminum pan and heated to 330° C. at 10° C./min from room temperature. In order to completely melt the semi-aromatic polyamide resin (A), the temperature is maintained at 330° C. for 5 minutes, and then lowered to 30° C. at 10° C./min. Then, after the temperature is maintained at 30° C. for 5 minutes, a second heating is performed to 330° C. at 10° C./min. In the second heating, the peak temperature (° C.) is determined to be as the melting point (Tm) of the semi-aromatic polyamide resin (A), and the displacement point corresponding to glass transition as the glass transition temperature (Tg). As described below, the measurement of the resin composition of the present invention performed in the same manner by DSC also allows the melting point (Tm) derived from the semi-aromatic polyamide resin (A) to be specified.

Further, the intrinsic viscosity [η] of the semi-aromatic polyamide resin (A) measured in 96.5% sulfuric acid at 25° C. is preferably 0.7 to 1.6 dl/g, more preferably 0.8 to 1.2 dl/g. The intrinsic viscosity [η] of the semi-aromatic polyamide resin (A) in the above-mentioned range tends to sufficiently enhance the mechanical strength of the resin composition and increases the fluidity during molding of the resin composition. As a result, the resultant molded product tends to have improved mechanical properties. The intrinsic viscosity [η] is adjusted by the molecular weight of the semi-aromatic polyamide resin (A). The molecular weight of the semi-aromatic polyamide resin (A) is adjusted, for example, by blending a molecular weight adjusting agent (e.g., terminal capping agent) into the reaction system during the preparation.

About 0.5 g of the semi-aromatic polyamide resin (A) is dissolved in 50 ml of 96.5% concentrated sulfuric acid, and the flowing time of the resultant solution at 25° C.±0.05° C. is measured using an Ubbelohde viscometer. The intrinsic viscosity is calculated based on the following equation:

$$[\eta]=\eta SP/(C(1+0.205\eta SP)).$$

[η]: intrinsic viscosity (dl/g)
ηSP: specific viscosity
C: sample concentration (g/dl)
t: flowing time of sample solution (second)
t0: flowing time of blank sulfuric acid (second)
ηSP=(t−t0)/t0

As described above, the semi-aromatic polyamide resin (A) may be capped with a terminal capping agent. The terminal capping agent may be, for example, a monocarboxylic acid or a monoamine. The amount of the carboxyl group and the amount of the amino group contained in the semi-aromatic polyamide resin (A) can be adjusted by capping the carboxyl group and/or the amino group at the terminal of the semi-aromatic polyamide resin (A).

Further, the amount of the terminal amino groups in the molecular chains of the semi-aromatic polyamide resin (A) is preferably 0.1 to 200 mmol/kg, more preferably 0.1 to 150 mmol/kg, particularly preferably 0.1 to 120 mmol/kg. The presence of the amino group at the terminal of the semi-aromatic polyamide resin (A) in an amount of 0.1 mmol/kg or more enhances the compatibility between the semi-aromatic polyamide resin (A) and the acid-modified polyolefin resin (B), and the strength of the surface of the resultant molded product tends to increase. Further, since the adhesiveness between the semi-aromatic polyamide resin (A) and the fibrous filler (C) also increases, the molded product tends to have improved mechanical properties such as impact resistance. On the other hand, with an amount of the terminal amino group of 200 mmol/kg or less, the water absorption of the semi-aromatic polyamide resin (A) can be suppressed at a low level, so that the resultant molded product tends to be excellent in heat resistance and the like. The amount of the terminal amino group can be adjusted by the ratio between the diamine and the dicarboxylic acid to be reacted during the preparation of the semi-aromatic polyamide resin (A) or the amount of the terminal capping agent. For example, the amount of the terminal amino group can be adjusted by adding a terminal capping agent composed of a monocarboxylic acid and the like to the system containing a diamine and a dicarboxylic acid during the preparation of the semi-aromatic polyamide resin (A) so as to cap a part of the terminals.

The amount of the terminal amino group is measured by the following method. The semi-aromatic polyamide resin (A) in an amount of 1 g is dissolved in 35 mL of phenol, which is mixed with 2 mL of methanol to make a sample solution. Then, using thymol blue as an indicator, the sample solution is titrated with 0.01 N HCl aqueous solution, so as to determine the amount of the terminal amino group ([$NH_2$], unit: mmol/kg).

Here, the dicarboxylic acid component unit of the semi-aromatic polyamide resin (A) includes at least a terephthalic acid component unit. The inclusion of the terephthalic acid component unit as a component of the resin enhances the stiffness of the semi-aromatic polyamide resin (A), so that the rigidity, heat resistance, and chemical resistance of the resin composition are enhanced.

The amount of the terephthalic acid component unit contained in the semi-aromatic polyamide resin (A) is 60 mol % or more, preferably 65 to 100 mol %, more preferably 70 to 100 mol %, relative to the total number of moles of the dicarboxylic acid component units constituting the semi-aromatic polyamide resin (A). With a content of the terephthalic acid component unit of 60 mol % or more in the terephthalic acid component unit, the rigidity, heat resistance, chemical resistance, and the like of the semi-aromatic polyamide resin composition tend to be sufficiently enhanced.

The semi-aromatic polyamide resin (A) may contain a component unit derived from dicarboxylic acids other than terephthalic acid as the dicarboxylic acid component unit. Examples of the dicarboxylic acid other than terephthalic acid include: aromatic dicarboxylic acids such as isophthalic acid, 2-methylterephthalic acid, and naphthalenedicarboxylic acid; alicyclic dicarboxylic acids such as furandicarboxylic acids e.g., 2,5-furandicarboxylic acid, 1,4-cyclohexanedicarboxylic acid and 1,3-cyclohexanedicarboxylic acid; aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinate, azelaic acid, sebacic acid, and suberic acid; and aliphatic dicarboxylic acids having 11 or more carbon atoms. The semi-aromatic polyamide resin (A) may contain a single type of component unit derived from those or two or more types thereof. The dicarboxylic acid component unit other than terephthalic acid component unit is preferably a component unit derived from aromatic dicarboxylic acids, more preferably an isophthalic acid component unit.

When the semi-aromatic polyamide resin (A) contains a terephthalic acid component unit and an isophthalic acid component unit as the dicarboxylic acid component units, the molar ratio therebetween (terephthalic acid component unit/isophthalic acid component unit) is preferably 60/40 to 99.9/0.1, more preferably 60/40 to 90/10, furthermore preferably 60/40 to 85/15. With an amount of the terephthalic acid component unit in the above-mentioned range, the heat resistance of the resin composition and the like tend to increase as described above.

Meanwhile, the aliphatic diamine component unit constituting the semi-aromatic polyamide resin (A) preferably contains a component unit having 4 to 18 carbon atoms derived from a straight-chain alkylenediamine (hereinafter also referred to as "straight-chain alkylenediamine component unit"), or a component unit having 4 to 18 carbon atoms derived from an alkylenediamine having a side chain (hereinafter also referred to as "side-chain alkylenediamine component unit"). Herein, the number of carbon atoms of the side-chain alkylenediamine includes the number of carbon atoms included in the side chain. The semi-aromatic polyamide resin (A) may contain any one of these, and preferably contains both.

Here, relative to the total number of moles of aliphatic diamine component unit (100 mol %), the content of the straight-chain alkylenediamine component unit is preferably 40 to 90 mol %, more preferably 50 to 80 mol %. With a certain content or more of the straight-chain alkylenediamine component unit, the resin composition has excellent toughness.

The number of carbon atoms of the straight-chain alkylenediamine component unit is preferably 4 to 15, more preferably 6 to 12. Specific examples of the straight-chain alkylenediamine component unit include 1,4-diaminobutane, 1,6-diaminohexane, 1,7-diaminoheptane, 1,8-diaminooctane, 1,9-diaminononane, 1,10-diaminodecane, 1,11-diaminoundecane, and 1,12-diaminododecane. One or a plurality of straight-chain alkylenediamine component units may be contained in the semi-aromatic polyamide resin (A). Among them, 1,6-diaminohexane and 1,9-nonanediamine are preferred, and preferably these in an amount of 50 to 100 mol % in total are contained relative to the total number of moles (100 mol %) of the straight-chain alkylenediamines.

On the other hand, the side-chain alkylenediamine component unit in an amount of preferably 10 to 60 mol %, more preferably 20 to 50 mol %, is contained relative to the total number of moles (100 mol %) of the aliphatic diamine component units. A certain amount or more of side-chain alkylenediamine component unit contained in the semi-aromatic polyamide resin (A) tends to enhance the impact resistance of the resin composition. Although the reason is not clear, it is conceivable that the side chain structure improves the dispersibility of the acid-modified polyolefin resin (B).

The number of carbon atoms in the side-chain alkylenediamine component unit is preferably 4 to 15, more preferably 6 to 12. Specific examples of the side-chain alkylenediamine component unit include 2-methyl-1,5-diaminopentane, 2-methyl-1,6-diaminohexane, 2-methyl-1,7-diaminoheptane, 2-methyl-1,8-diaminooctane, 2-methyl-1,9-diaminononane, 2-methyl-1,10-diaminodecane, and 2-methyl-1,11-diaminoundecane. One or a plurality of side-chain alkylenediamine component units may be contained in the semi-aromatic polyamide resin (A). Among them, 2-methyl-1,5-diaminopentane and 2-methyl-1,8-octanediamine are preferred.

As described above, the semi-aromatic polyamide resin (A) preferably contains a straight-chain alkylenediamine component unit and a side-chain alkylenediamine component unit as the aliphatic diamine component units, and examples of the preferred combination include the combination of 1,6-diaminohexane component unit and 2-methyl-1,5-pentanediamine component unit. In this case, more than 45 mol % and less than 55 mol % of 1,6-diaminohexane component unit and more than 45 mol % and less than 55 mol % of 2-methyl-1,5-pentanediamine are preferably contained relative to the total number of moles of the aliphatic diamine component units. Other examples of the preferable combination include the combination of 1,9-nonanediamine component unit and 2-methyl-1,8-octanediamine component unit. In this case, more than 45 mol % and less than 85 mol % of 1,9-nonanediamine component unit and more than 15 mol % and less than 55 mol % of 2-methyl-1,8-octanediamine component unit are preferably contained relative to the total number of moles of the aliphatic diamine component units.

The aliphatic diamine component unit may contain an aliphatic carbon-based diamine component unit having a larger number of carbon atoms than the straight-chain alkylenediamine component unit or a side-chain alkylenediamine component unit within a range that does not impair the effects of the present invention. The semi-aromatic polyamide resin (A) may also contain a diamine component unit other than the aliphatic diamine component units within a range that does not impair the effects of the present invention. Examples of the diamine component unit other than the aliphatic diamine component units include an alicyclic diamine component unit and an aromatic diamine component unit.

Particularly preferred examples of the semi-aromatic polyamide resin (A) include: a resin having a terephthalic acid component unit as the dicarboxylic acid component unit and 1,6-diaminohexane and 2-methyl-1,5-pentanediamine as the aliphatic diamine component units; a resin having a terephthalic acid component unit as the dicarboxylic acid component unit and 1,9-nonanediamine and 2-methyl-1,8-pentanediamine as the aliphatic diamine component units; and a resin having a terephthalic acid component unit and an isophthalic acid component unit as the dicarboxylic acid component units and 1,6-diaminohexane as the aliphatic diamine component unit.

The semi-aromatic polyamide resin (A) can be manufactured in the same manner as for known semi-aromatic polyamides, for example, by polycondensing a dicarboxylic acid and a diamine in a homogeneous solution. More specifically, the manufacturing method includes heating a dicarboxylic acid and a diamine in the presence of a catalyst to obtain a low-level condensate as described in WO03/085029, and then applying a shear stress to the melt of the low-level condensate for polycondensation.

Further, as described above, in the case of adjusting the intrinsic viscosity of the semi-aromatic polyamide resin (A), a molecular weight adjusting agent (e.g., terminal capping agent) is preferably blended into the reaction system. The molecular weight adjusting agent can be, for example, a monocarboxylic acid or a monoamine. Examples of the monocarboxylic acid which can be a molecular weight adjusting agent include aliphatic monocarboxylic acids having 2 to 30 carbon atoms, aromatic monocarboxylic acids, and alicyclic monocarboxylic acids. The molecular weight adjusting agent can control the amount of terminal amino groups of the semi-aromatic polyamide resin (A) as well as the molecular weight of the semi-aromatic polyamide resin (A). Incidentally, the aromatic monocarboxylic acid and the alicyclic monocarboxylic acid may have a substituent on the cyclic structure portion.

Examples of the aliphatic monocarboxylic acid include acetic acid, propionic acid, butyric acid, valeric acid, caproic acid, caprylic acid, lauric acid, tridecyl acid, myristic acid, palmitic acid, stearic acid, oleic acid, and linoleic acid. Examples of the aromatic monocarboxylic acid include benzoic acid, toluic acid, naphthalene carboxylic acid, methylnaphthalene carboxylic acid, and phenylacetic acid. Examples of the alicyclic monocarboxylic acid include cyclohexane carboxylic acid.

The molecular weight adjusting agent is added to the reaction system of a dicarboxylic acid and a diamine. The amount to be added is preferably 0.07 mol or less, more preferably 0.05 mol or less, relative to 1 mol of the dicarboxylic acids in total. The use of the molecular weight adjusting agent in such an amount allows at least a part thereof to be incorporated in the polyamide. Consequently, the molecular weight of the polyamide, the intrinsic viscosity [η], is adjusted within a desired range.

1-2. Acid-modified Polyolefin Resin (B)

The acid-modified polyolefin resin (B) means a resin in which an olefin polymer is modified with an acid group or a compound containing the derivative thereof, and which has a structure including a skeleton of olefin polymer to which an acid group or a structural unit containing the derivative group thereof (acid group-containing structural unit) is bonded.

The acid group or the derivative group thereof is preferably a functional group containing a hetero atom, more specifically, a functional group containing carbon, hydrogen, and oxygen. Examples of the specific acid group and the derivative group thereof include carboxylic acid group, carboxylic anhydride group, carboxylate group, ester group, and amide group. Among these, a carboxylic anhydride group is preferred.

Here, an amount of preferably 0.1 to 1.5 parts by mass, more preferably 0.2 to 1.1 parts by mass of the acid group-containing structure is bonded (graft bonded) to 100 parts by mass of the olefin polymer forming the skeleton. With a graft amount of the acid group-containing structural unit in the acid-modified polyolefin resin (B) within the above-mentioned range, the impact resistance of a molded product obtained from the resin composition tends to be enhanced, and the flowability during molding also tends to be enhanced. With a certain content of the acid group-containing structural units, the semi-aromatic polyamide resin (A) and the functional group of the acid-modified polyolefin resin (B) are more easily reacted or interacted, so that the acid-modified polyolefin resin (B) is more easily dispersed in a resin composition of the semi-aromatic polyamide resin (A). It is presumed that the impact resistance of a molded product is thus enhanced.

The amount of the acid group-containing structural units contained in the acid-modified polyolefin resin (B) can be identified from the feed ratio between the olefin polymer and the compound which contains an acid group or a derivative group thereof, or by known means such as $^{13}$C-NMR measurement or $^{1}$H-NMR measurement. Examples of the specific NMR measurement conditions are as follows.

$^{1}$H-NMR measurement can be performed, for example, using an ECX400 nuclear magnetic resonance apparatus manufactured by JEOL Ltd. under the following conditions: solvent: deuterated o-dichlorobenzene, sample concentration: 20 mg/0.6 mL, measurement temperature: 120° C., observing nucleus: $^{1}$H (400 MHz), sequence: a single pulse, pulse width: 5.12 μseconds (45° pulse), repetition time: 7.0 seconds, and cumulative number: 500 or more. Hydrogen of tetramethylsilane is used as the reference chemical shift at 0 ppm. Alternatively, the peak derived from residual hydrogen of deuterated o-dichlorobenzene may be used as the reference chemical shift at 7.10 ppm to obtain similar results. The peaks of $^{1}$H derived from a functional group-containing compound may be assigned by a conventional method.

$^{13}$C-NMR measurement can be performed, for example, using an ECP500 nuclear magnetic resonance apparatus manufactured by JEOL Ltd. under the following conditions: solvent: o-dichlorobenzene/heavy benzene (80/20 vol %) mixture solvent, measurement temperature: 120° C., observing nucleus: $^{13}$C (125 MHz), single pulse proton decoupling, 45° pulse, repetition time: 5.5 seconds, cumulative number: 10,000 or more, and reference chemical shift: 27.50 ppm. The various kinds of signals are assigned by a conventional method, and the quantitative determination can be performed based on the integrated value of signal strength.

Alternatively, the content of the acid group-containing structural unit contained in the acid-modified polyolefin resin (B) may be conveniently measured by the following method. The acid group-containing structural unit contents of different polymers each having a different content are determined by NMR measurement, and each polymer is subjected to infrared spectroscopy (IR). A calibration curve between the intensity ratio of specific peaks of the infrared spectroscopy (IR) spectrum and the acid group-containing structural unit content is created. The acid group-containing structural unit content of any polymer is determined based on the calibration curve. Although this method is more convenient than the NMR measurement described above, it is basically necessary to create a separate calibration curve based on the type of the base resin and the functional groups. For this reason, this method is preferably used, for example, in a process control or the like for producing a resin in a commercial plant.

The Vicat softening point (° C.) of the acid-modified polyolefin resin (B) measured in accordance with ASTM D1525 is 45 to 110° C., more preferably 90 to 110° C., furthermore preferably 95 to 110° C. Incidentally, in the case of the resin composition of the present invention containing a plurality of acid-modified polyolefin resins (B), the Vicat softening point is assumed to be the sum of "the product of the content ratio (mass ratio) of each of the acid-modified polyolefin resins (B) and the Vicat softening point thereof." For example, when $\beta_1$ g of a polyolefin resin (B1') having a Vicat softening point of $\alpha_1$° C. and $\beta_2$ g of a polyolefin resin (B1") having a Vicat softening point of $\alpha_2$° C. are contained, the Vicat softening point is obtained as follows. Incidentally, when the resin composition of the present invention contains three acid-modified polyolefin resins (B), the Vicat softening point can be obtained in the same manner.

$$\text{Vicat softening point} = \alpha_1 \times \beta_1/(\beta_1+\beta_2) + \alpha_2 \times \beta_2/(\beta_1+\beta_2)$$

A resin composition containing the acid-modified polyolefin resin (B) having a Vicat softening point of 45° C. or higher has less change in hardness with temperature, and is less likely to be subjected to thermal history. In other words, the heat shock resistance of the resin composition is enhanced. Consequently, the resultant molded product has less change in hardness at a joint interface, being suitable as automotive parts for use in an engine compartment which require heat shock resistance. On the other hand, the Vicat softening point of 110° C. or lower tends to enhance the impact resistance of a molded product made from the resin composition. Furthermore, the volume resistivity increases, and the insulating properties at high temperature tends to be enhanced.

The Vicat softening point is measured in accordance with ASTM D1525. Specifically, the acid-modified polyolefin resin (B) is molded by injection molding with a cylinder at a temperature of the melting point (Tm) of the acid-modified polyolefin resin (B)+10° C. to prepare a sample piece (12.5 mm (width)×120 mm (length)×3 mm (thickness)). The Vicat softening point is then measured by A50 method in accordance with ASTMD1525.

The acid-modified polyolefin resin (B) has a density of preferably 890 to 940 Kg/m³, more preferably 910 to 940 g/cm³. The density is measured at 23° C., using a density gradient tube in accordance with JIS K7112. The density of the acid-modified polyolefin resin (B) in the above-mentioned range tends to enhance the impact resistance of the resultant molded product, and tends to enhance the mold releasing properties in molding.

Further, the intrinsic viscosity [η] of the acid-modified polyolefin rein (B) measured in decalin (decahydronaphthalene) solution at 135° C. is preferably 0.5 to 4.0 dl/g, more preferably 0.5 to 3 dl/g, furthermore preferably 0.7 to 3 dl/g. With an intrinsic viscosity [η] of the acid-modified polyolefin rein (B) in the above-mentioned range, the resin composition of the present invention can exhibit both impact resistance and melt flowability at a high level.

The intrinsic viscosity [η] of the acid-modified polyolefin resin (B) in decalin at 135° C. is measured by a conventional method as follows. A sample in an amount of 20 mg is dissolved in 15 ml of decalin, and the specific viscosity (ηsp) is measured in an atmosphere at 135° C. with an Ubbelohde viscometer. To the decalin solution, 5 ml of decalin is further added for dilution, and the specific viscosity is measured in the same manner. The dilution and the viscosity measurement are further repeated twice, and based on the thus obtained measurement, the "ηsp/C" value is obtained by extrapolating concentration (C) to zero and the obtained value is used as the intrinsic viscosity [η].

The melt flow rate of the acid-modified polyolefin resin (B) (190° C., with a load of 2.16 kg) is preferably in the range of 0.1 to 50 g/10 min, more preferably in the range of 0.3 to 40 g/10 min, furthermore preferably in the range of 0.3 to 30 g/10 min. A melt flow rate of the acid-modified polyolefin resin (B) within the above-mentioned range tends to enhance the impact resistance of the resultant molded product, and also tends to enhance the fluidity of the resin composition during molding.

As mentioned above, the acid-modified polyolefin resin (B) can be obtained, for example, by reacting an olefin polymer with a compound containing an acid group or a derivative group thereof in the structure at a specific ratio.

Examples of the olefin polymer as the skeleton of the acid-modified polyolefin resin (B) include known olefin polymers such as ethylene polymers, propylene polymers, and butene polymers.

The olefin polymer is preferably a copolymer of ethylene and an α-olefin (ethylene-α-olefin copolymer), more preferably a copolymer of ethylene and an α-olefin having 3 to 10 carbon atoms e.g., propylene, 1-butene, 1-hexene, 4-methyl-1-pentene, 1-octene, and 1-decene. Specific examples of the ethylene-α-olefin copolymer include ethylene-propylene copolymers, ethylene-1-butene copolymers, ethylene-1-hexene copolymers, ethylene-1-octene copolymers, and ethylene-4-methyl-1-pentene copolymers. An ethylene-propylene copolymer, an ethylene-1-butene copolymer, an ethylene-1-hexene copolymer, and an ethylene-1-octene copolymer are particularly preferred.

The method for manufacturing the ethylene-α-olefin copolymer is not particularly limited, and can be, for example, a known method using a transition metal catalyst such as titanium (Ti), vanadium (V), chromium (Cr), or zirconium (Zr). More specific examples of the manufacturing method include copolymerizing ethylene with one or more α-olefins having 3 to 10 carbon atoms in the presence of a Ziegler catalyst or a metallocene catalyst including a V containing compound and an organoaluminum compound. In particular, the manufacturing method using a metallocene catalyst is preferred.

It has been confirmed that the density of the ethylene-α-olefin copolymer before modification is almost unchanged through graft modification. Accordingly, it is preferred that the ethylene-α-olefin copolymer for use as raw material has a similar density as the above-mentioned acid-modified polyolefin resin (B). Specifically, the ethylene-α-olefin copolymer has a density of preferably 890 to 940 kg/m³, more preferably 910 to 940 kg/cm³.

Meanwhile, although the compound containing an acid group or a derivative group thereof to be reacted with the olefin polymer is not particularly limited as long as the compound has an acid group or a derivative group thereof and a group bondable to the olefin polymer, unsaturated carboxylic acids or derivatives thereof are preferred. Specific examples of the unsaturated carboxylic acids or the derivatives thereof include unsaturated carboxylic acids such as acrylic acid, methacrylic acid, α-ethyl acrylic acid, maleic acid, fumaric acid, itaconic acid, citraconic acid, tetrahydrophthalic acid, methyltetrahydrophthalic acid, and endocis-bicyclo [2,2,1]hepto-5-ene-2,3-dicarboxylic acid (Nadic acid [trademark]), and derivatives such as acid halides, amides, imides, acid anhydrides, and esters thereof. Among them, unsaturated dicarboxylic acids or acid anhydrides thereof are suitable, and maleic acid, Nadic acid (trademark), or acid anhydrides thereof are suitable.

A particularly preferred compound is maleic anhydride. Maleic anhydride has a relatively high reactivity with olefin polymers, and due to its chemically stable structure, does not easily polymerize with each other, for example. Consequently, an acid-modified polyolefin polymer (B) with stable quality can be easily obtained.

Examples of the method for preparing the acid-modified polyolefin resin (B) include so-called graft modification of an ethylene-α-olefin copolymer with an unsaturated carboxylic acid or a derivatives thereof, though the method is not limited thereto.

The graft modification of ethylene-α-olefin copolymers may be performed by a known method. Examples of the method include dissolving an ethylene-α-olefin copolymer in an organic solvent, and then adding an unsaturated carboxylic acid or a derivative thereof and a radical initiator or the like to the resultant solution for a reaction at a temperature of typically 60 to 350° C., preferably 80 to 190° C., for 0.5 to 15 hours, preferably 1 to 10 hours.

The organic solvent for dissolving an ethylene-α-olefin copolymer is not particularly limited, and can be an aromatic hydrocarbon solvent such as benzene, toluene, and xylene; or an aliphatic hydrocarbon solvent such as pentane, hexane, and heptane.

Other examples of the graft modification of an ethylene-α-olefin copolymer include a method in which an ethylene-α-olefin copolymer is reacted with an unsaturated carboxylic acid or a derivative thereof, preferably in the absence of a solvent, with an extruder or the like. The reaction conditions in this case preferably include a reaction temperature of typically equal to or higher than the melting point of the ethylene-α-olefin copolymer, more specifically 100 to 350° C. The reaction time may be set to typically 0.5 to 10 minutes.

In order to achieve an efficient graft modification reaction of an ethylene-α-olefin copolymer with an unsaturated carboxylic acid or a derivative thereof, the modification reaction is preferably performed in the presence of a radical initiator. Examples of the radical initiator include: organic peroxides and organic peresters such as benzoyl peroxide, dichlorobenzoyl peroxide, dicumyl-peroxide, di-t-butyl peroxide, 2,5-dimethyl-2,5-di(peroxide benzoate)hexyne-3,1,4-bis(t-butylperoxyisopropyl)benzene, lauroyl peroxide, t-butylperacetate, 2,5-dimethyl-2,5-di(t-butylperoxy)hexyne-3, 2,5-dimethyl-2,5-di(t-butylperoxy)hexane, t-butylperbenzoate, t-butylperphenylacetate, t-butylperisobutyrate, t-butylper-sec-octoate, t-butylperpivalate, cumylperpivalate, and t-butylperdiethylacetate; and azo compounds such as azobisisobutyronitrile and dimethylazoisobutyrate.

Among them, dialkyl peroxides such as dicumylperoxide, di-t-butylperoxide, 2,5-dimethyl-2,5-di(t-butylperoxy)hexyne-3,2,5-dimethyl-2,5-di(t-butylperoxy)hexane, and 1,4-bis(t-butylperoxyisopropyl)benzene are preferred. The radical initiator is used in a proportion of typically 0.001 to 1 part by mass relative to 100 parts by mass of the ethylene-α-olefin copolymer.

1-3. Fibrous Filler (C)

The fibrous filler (C) is not particularly limited, and may be any one of a fibrous filler of inorganic compound and a fibrous filler of organic compound. Examples of the fibrous filler (C) include glass fiber, carbon fiber, wholly aromatic polyamide fiber (e.g., polyparaphenylene terephthalamide fiber, polymetaphenylene terephthalamide fiber, polyparaphenylene isophthalamide fiber, polymetaphenylene isophthalamide fiber, and fiber obtained from a condensate of diaminodiphenyl ether and terephthalic acid or isophthalic acid), boron fiber, and liquid crystal polyester fiber. One or a plurality of the fibrous filler (C) may be contained in the resin composition. In particular, at least one of glass fiber, carbon fiber, and wholly aromatic polyamide fiber is preferred as the fibrous filler (C), since the use thereof enhances the mechanical properties and heat resistance of the resultant molded product.

From the viewpoints of improving adhesion to the semi-aromatic polyamide resin (A) that is the matrix resin of the resin composition of the present invention, and substantially improving the mechanical properties of the resultant molded product, the fibrous filler (C) is preferably subjected to a surface treatment. Examples of the surface treatment agent for the fibrous filler (C) include coupling agents such as silane coupling agents, titanium coupling agents, and aluminate coupling agents, and sizing agents. Preferred examples of the coupling agent include aminosilane, epoxysilane, methyltrimethoxysilane, methyltriethoxysilane, γ-glycidoxypropyltrimethoxysilane, vinyltriacetoxysilane, and vinyltrimethoxysilane. Preferred examples of the sizing agent include epoxy compounds, urethane compounds, carboxylic acid compounds, urethane/maleic acid-modified compounds, and urethane/amine-modified compounds. These surface treatment agents may be used individually or in combination. In particular, when a coupling agent and a sizing agent are used in combination, the adhesion between the fibrous filler (C) and the semi-aromatic polyamide resin (A) is further improved, so that the mechanical properties of molded products obtained from the resin composition is further improved.

The mass reduction of the surface-treated fibrous filler (C) when heated at 625 ±20° C. for 10 minutes or more, i.e., the amount treated by the surface agent, is preferably 0.01 to 8.0 mass %, more preferably 0.1 to 5.0 mass %, relative to the total mass of the surface-treated fibrous filler (C).

The length of the fibrous filler (C) is not particularly limited, and preferably 1 μm to 20 mm, more preferably 5 μm to 10 mm. The fiber diameter of the fibrous filler is preferably 0.1 μm to 100 μm, more preferably 3 μm to 50 μm. The fibrous filler (C) having the above-mentioned shape particularly enhances the mechanical strength of a molded product obtained from the resin composition.

1-4. Optional Additive

The resin composition of the present invention may contain optional additives within a range that does not impair the effects of the invention, depending on the application. Examples of such additives include antioxidants (such as phenols, amines, sulfur compounds, and phosphorus compounds), fillers (such as clay, silica, alumina, talc, kaolin, quartz, mica, and graphite), heat stabilizers (such as lactone compounds, vitamin E, hydroquinones, copper halides, and iodine compounds), light stabilizers (such as benzotriazoles, triazines, benzophenones, benzoates, hindered amines, and oxanilides), flame retardants (such as bromine-based retardants, chlorine-based retardants, phosphorus-based retardants, antimony-based retardants, and inorganic-based retardants), lubricants, fluorescent whitening agents, plasticizers, thickeners, antistatic agents, releasing agents, pigments, nucleating agents, and various known additives.

Further, the resin composition may contain polymers other than the above-mentioned semi-aromatic polyamide resin (A) and the acid-modified polyolefin resin (B). Examples of such polymers include olefin homopolymers such as polyethylene, ethylene-α-olefin copolymers such as ethylene-propylene copolymers and ethylene-1-butene copolymers, propylene-α-olefin copolymers such as propylene-1-butene copolymers, polystyrene, polyamides, polycarbonates, polyacetal, polysulfone, polyphenylene oxide, fluorine resins, silicone resins, and LCP.

1-5. Constitution of Semi-aromatic Polyamide Resin Composition

As described above, the semi-aromatic polyamide resin composition contains a semi-aromatic polyamide resin (A), an acid-modified polyolefin resin (B), a fibrous filler (C), and other resins and additives on an as needed basis, and resins or the like other than the above.

In the semi-aromatic polyamide resin composition of the present invention, the amount of the semi-aromatic polyamide resin (A) is preferably 30 to 90 mass %, more preferably 40 to 80 mass % relative to the total of the semi-aromatic polyamide resin (A), the acid-modified polyolefin resin (B), and the fibrous filler (C). With a content of the semi-aromatic polyamide resin (A) in the above-mentioned range, the semi-aromatic polyamide resin composition tends to have enhanced rigidity and improved toughness.

Meanwhile, the amount of the acid-modified polyolefin resin (B) in the semi-aromatic polyamide resin composition is 1 mass % to 23 mass %, preferably 3 mass % to 20 mass %, furthermore preferably 5 mass % to 18 mass %, relative to the total of the semi-aromatic polyamide resin (A), the acid-modified polyolefin resin (B), and the fibrous filler (C). With an amount of the acid-modified polyolefin resin (B) of 23 mass % or less, the affinity with the semi-aromatic polyamide resin (A) can be enhanced, so that the acid-modified polyolefin resin (B) can be finely dispersed in the resin composition. As a result, the heat resistance and the heat shock resistance can be maintained over a long period of time from the resin composition of the present invention to a molded product thereof. With a content of the acid-modified polyolefin resin (B) of 1 mass % or more, the impact resistance of the resultant molded product tends to be enhanced.

Here, the difference (MA–MB) between "the total number of moles (MA) of the terminal amino group of the semi-aromatic polyamide resin (A)" contained in the resin composition of the present invention and "the total number of moles (MB) of the acid group and the derivative group thereof in the acid-modified polyolefin resin (B)" contained in the resin composition of the present invention is preferably 3.0 or more, more preferably 3.0 to 100, furthermore preferably 5 to 80. With a difference (MA–MB) of 3.0 or more, the adhesion between the semi-aromatic polyamide resin (A) or the acid-modified polyolefin resin (B) and the fibrous filler (C) is improved, so that excellent mechanical strength can be achieved.

"The total number of moles (MA) of the terminal amino group of the semi-aromatic polyamide resin (A)" contained in the resin composition is obtained by determining the number of moles of the terminal amino groups contained in 1 g of the semi-aromatic polyamide resin (A) by neutralization titration using an indicator, and by integrating the amount of the semi-aromatic polyamide resin (A) contained in the resin composition. On the other hand, "the total number of moles (MB) of the acid group and the derivative group thereof in the acid-modified polyolefin resin (B)" is also obtained by determining the number of moles of the acid groups or the derivative groups thereof contained in 1 g of the acid-modified polyolefin resin (B) by neutralization titration using an indicator, and by integrating the amount of the acid-modified polyolefin resin (B) contained in the resin composition.

From the viewpoints of the moldability of the resin composition and the mechanical properties (e.g., impact resistance) of the resultant molded product, the amount of the fibrous filler (C) contained in the resin composition of the present invention is preferably in the range of 5 to 60 mass %, more preferably 10 to 50 mass %, relative to the total of the semi-aromatic polyamide resin (A), the acid-modified polyolefin resin (B), and the fibrous filler (C).

Incidentally, when the semi-aromatic polyamide resin composition contains a polymer (e.g., olefin polymer) other than the above-mentioned semi-aromatic polyamide resin (A) and the acid-modified polyolefin resin (B), the polymer content is preferably 5 mass % or less, more preferably 3 mass % or less, relative to the total mass of the polyamide resin composition.

1-6. Physical Properties of Semi-aromatic Polyamide Resin Composition

The semi-aromatic polyamide resin composition of the present invention contains a semi-aromatic polyamide resin (A) and an acid-modified polyolefin resin (B). Since the softening temperature of the acid-modified polyolefin resin (B) is relatively high and the like, the resultant molded product has a reduced change in the frictional force on the surface between at room temperature (23° C.) and at about 90° C. as the working temperature in automobile applications, for example. In other words, a temperature change hardly causes the change in hardness of the surface of a molded product. As a result, when a molded product obtained from the resin composition of the present invention is joined to a member made of another resin, the hardness hardly changes at the interface therebetween, so that the strength of the junction can be maintained even when subjected to repeated heat shocks.

Comparison of the hardness of the surface of a molded resin product between at room temperature and at 90° C. can be evaluated by the ratio of the frictional force using a lateral force microscope (LFM). Lateral force microscopy (LFM), i.e. an application of atomic force microscopy (AFM), is a means for measuring the frictional force on the surface of a sample. In LFM, a displacement (twist) in the lateral direction is detected when a cantilever is scanned in the lateral direction. The amount of twist is detected as a voltage value, and the frictional force, i.e. the hardness of the surface of a sample, increases with this value. In particular, the frictional behavior of a polymer is related to the thermal motion characteristics of molecular chains. The change in hardness of a surface resulting from temperature change can be therefore evaluated by measuring not only the thermal characteristics of the bulk of the semi-aromatic polyamide resin composition of the present invention but also the thermal characteristics of the outermost surface, i.e. the frictional force.

The frictional force on the surface of the resin composition of the present invention is measured according to the following procedures (1) to (4), using a lateral force microscope (LFM). The ratio between the frictional force T(23) at 23° C. and the frictional force T(90) at 90° C., i.e. (T(90)/T(23)), is preferably 5 or less, more preferably 3 or less.

With a ratio between the frictional force T(23) at 23° C. and the frictional force T(90) at 90° C., i.e. (T(90)/T(23)), measured using a lateral force microscope (LFM), of 5 or less, the change in hardness is reduced when the temperature is changed from room temperature to 90° C., so that the heat shock resistance is enhanced. The ratio of the frictional force is adjusted by the softening point of the acid-modified polyolefin resin (B) or the amount of the acid-modified polyolefin resin (B).

—Measurement Method of Frictional Force by Lateral Force Microscopy (LFM)

(1) Preparation of Sample for LFM

Using the below-mentioned injection molding machine, a sample piece having a length of 90 mm, a width of 48 mm, and a thickness of 3 mm is made under the molding conditions adjusted as follows. A sample piece having a length of 10 mm, a width of 10 mm, and a thickness of 3 mm is cut out from the above-mentioned sample piece, for use in LFM.

Molding machine: SG50, manufactured by Sumitomo Heavy Industries, Ltd.

Molding machine cylinder temperature: melting point of semi-aromatic polyamide resin (A)+15° C., Mold temperature: Tg of semi-aromatic polyamide resin (A)+20° C.

(2) Under high vacuum conditions ($1.0 \times 10^{-4}$ Pa or less), the cantilever probe (spring constant: 0.1 N/m) of a lateral force microscope (environmental control probe microscope NANONAVI/E-SWEEP, manufactured by Hitachi High-Tech Science Corporation) is pressed onto the above-mentioned sample with a load of 4 nN, and reciprocated in parallel with the film surface, in the direction perpendicular to the cantilever direction, with an amplitude of 1 μm at a cycle of 0.5 Hz. On this occasion, the values (lateral force) calculated from the amount of twist of the cantilever are measured at intervals of 1° C. in the temperature range of 10° C. to 121° C.

(3) The frictional force obtained in the above (2) is plotted against the temperature.

(4) From the observation of the plotted force in the above (3), the ratio between the frictional force T(23) at 23° C. and the frictional force T(90) at 90° C., i.e. (change in hardness=T(90)/T(23)), is obtained.

There exist various methods of testing the heat shock resistance of molded products obtained from the resin composition of the present invention, including the following method as an example. The resin composition of the present invention and another resin are molded by multi-color molding or the like, so that a sample piece composed of a member obtained from the resin composition of the present invention and a member obtained from the other resin which are joined to each other is made. The joint strength A at the junction is then measured. Subsequently, a test to leave the sample piece in an ATF oil controlled at 130° C. for 5 minutes and then in an ATF oil cooled to 23° C. (or to −40° C.) for 5 minutes is repeated about 100 times. The joint strength B at the junction of the sample piece obtained after the heat cycles is measured. Then, the retention ratio of the joint strength B to the joint strength A is calculated for evaluation. Having a retention ratio of 95% or more, the junction with a part made of another resin is rated excellent, and it is expected that a resin composition and a molded product having heat shock resistance can be obtained.

Incidentally, molded products using the semi-aromatic polyamide resin composition of the present invention subjected to a further prolonged heat cycle test can maintain the joint strength at the junction with a part made of another resin, and it is expected that a resin composition and a molded product having a long-term reliability can be obtained.

Further, when the glass transition temperature of the semi-aromatic polyamide resin composition of the present invention is measured by a differential scanning calorimeter (e.g., DSC220C, manufactured by Seiko Instruments Inc.), the melting point (Tm) derived from the semi-aromatic polyamide resin (A) is clearly measured and the glass transition temperature is 90 to 180° C. as described above. In the present invention, since the melting point (Tm) derived from the semi-aromatic polyamide resin (A) is within the above-mentioned range, the mechanical strength of the molded product obtained from the resin composition is excellent. The method for measuring the glass transition temperature may be the same as the method for measuring the glass transition temperature of the semi-aromatic polyamide resin (A).

Further, the semi-aromatic polyamide resin composition of the present invention has a volume resistivity of preferably $10^{10}$ Ωcm or more, more preferably $10^{11}$ Ωcm, furthermore preferably $10^{12}$ Ωcm or more. With a volume resistivity of the semi-aromatic polyamide resin composition of $10^{10}$ Ωcm or more, the resultant molded products have excellent insulating properties. The method for measuring the volume resistivity is in accordance with ASTM D257: 2007, and a model 8340A manufactured by ADC Corporation is used for the measurement.

2. Manufacturing Method of Semi-aromatic Polyamide Resin Composition

The semi-aromatic polyamide resin composition of the present invention may be obtained by, for example, a method including the step of mixing the semi-aromatic polyamide resin (A), the acid-modified polyolefin resin (B), the fibrous filler (C), and other components as needed by a known method using a henschel mixer, a V-blender, a ribbon blender, a tumbler blender, or the like. The method may further include the steps of melt kneading the above-mentioned mixture using a monoaxial extruder, a multiaxial extruder, a kneader, a Banbury mixer, or the like, and subsequently granulating or grinding the kneaded product.

3. Molded Product Including Semi-aromatic Polyamide Resin Composition

The molded product including the semi-aromatic polyamide resin composition of the present invention has high rigidity and excellent impact resistance as described above. Further, the hardness of the molded product is hardly changed by temperature change. Accordingly, the molded product can be used in various applications.

Examples of the applications (molded products) of the semi-aromatic polyamide resin composition of the present invention include: exterior automotive parts such as a radiator grille, a rear spoiler, a wheel cover, a hubcap, a cowl vent grille, an air outlet louver, an air scoop, a hood bulge, a fender, and a backdoor; interior parts of an automotive engine compartment such as a cylinder head cover, an engine mount, an air intake manifold, a throttle body, an air intake pipe, a radiator tank, a radiator support, a water pump inlet, a water pump outlet, a thermostat housing, a cooling fan, a fan shroud, an oil pan, an oil filter housing, an oil filler cap, an oil level gauge, a timing belt, a timing belt cover, and an engine cover; automotive fuel system parts such as a fuel cap, a fuel filler tube, an automotive fuel tank, a fuel sender module, a fuel cut-off valve, a quick connector, a canister, a fuel delivery pipe, and a fuel filler neck; automotive drive train parts such as a shift lever housing and a propeller shaft; automotive chassis parts such as a stabilizer bar linkage rod; automotive functional parts such as a window regulator, a door lock, a door handle, an outside door mirror stay, an accelerator pedal, a pedal module, a seal ring, a bearing, a bearing retainer, a gear, and an actuator; automotive electronic parts such as a wire harness connector, a relay block, a sensor housing, an encapsulation, an ignition coil, and a distributor cap; fuel parts for general-purpose apparatus such as a fuel tank for general-purpose apparatus (a brushcutter, a lawn mower, and a chain saw); and electric and electronic parts, such as a connector and an LED reflector.

Due to excellence in both of toughness such as impact resistance and elongation and mechanical properties such as tensile strength, as well as in properties such as heat resistance, low water absorption, chemical resistance, and long-term heat resistance, the semi-aromatic polyamide resin composition of the present invention may be preferably used as an automotive fuel tank, a quick connector, a bearing retainer, a fuel tank for general-purpose apparatus, a fuel cap, a fuel filler neck, a fuel sender module, a hubcap, a fender, or a backdoor, in particular.

Further, as described above, the semi-aromatic polyamide resin composition of the present invention allows parts to be joined to another material to have excellent heat shock resistance. The semi-aromatic polyamide resin composition of the present invention is therefore suitably used in multi-color molded products and multi-layer molded products which include a part derived from the semi-aromatic polyamide resin composition of the present invention and a part derived from another material. Examples of the other material which can be joined to the semi-aromatic polyamide resin composition of the present invention include a resin composition including a resin other than the above-mentioned semi-aromatic polyamide resin (A), a metal, and a ceramic. Multi-color molded products and multi-layer molded products may contain two or more thereof.

The semi-aromatic polyamide resin composition of the present invention can be preferably used particularly in multi-color molded products having a region formed of the semi-aromatic polyamide resin composition of the present invention and a region formed of a resin composition other than the semi-aromatic polyamide resin composition of the present invention, and in multi-layer molded products containing the semi-aromatic polyamide resin composition of the present invention and a resin composition other than the semi-aromatic polyamide resin composition of the present invention.

Examples of the resin which may be contained in the other material include: polyolefin resins such as low-density polyethylenes, medium-density polyethylenes, high-density polyethylenes, polypropylene, ethylene/propylene copolymers, ethylene/butene copolymers, ethylene/vinyl acetate copolymers, ethylene/vinyl acetate saponified copolymers, ethylene/acrylate copolymers, ethylene/methacrylate copolymers, ethylene/methyl acrylate copolymers, ethylene/methyl methacrylate copolymers, ethylene/ethyl acrylate copolymers, polybutadiene, ethylene/propylene/diene copolymers, and polystyrene; polyester resins such as polybutylene terephthalate, polyethylene terephthalate, polyethylene naphthalate, polybutylene naphthalate, polyethylene isophthalate, polyarylate, and liquid crystal polyesters; polyether resins such as polyacetals and polyphenylene oxide; polysulfone resins such as polysulfones and polyether sulfones; polythioether resins such as polyphenylene sulfide and polythioether sulfone; polyketone resins such as polyether ether ketones and polyallyl ether ketones; polynitrile resins such as polyacrylonitrile, polymethacrylonitrile, acrylonitrile/styrene copolymers, acrylonitrile/butadiene/styrene copolymers, and methacrylonitrile/butadiene/styrene copolymers; polymethacrylate resins such as polymethylmethacrylate and polyethylmethacrylate; polyvinyl ester resins such as polyvinyl acetate; polyvinyl chloride resins such as polyvinylidene chloride, polyvinyl chloride, vinyl chloride/vinylidene chloride copolymers, and vinylidene chloride/methyl acrylate copolymers; cellulose resins such as cellulose acetate and cellulose butyrate; fluorine resins such as polyvinylidene fluoride, polyvinyl fluoride, ethylene/tetrafluoroethylene copolymers, polychlorotrifluoroethylene, ethylene/chlorotrifluoroethylene copolymers, tetrafluoroethylene/hexafluoropropylene copolymers, and tetrafluoroethylene/hexafluoropropylene/vinylidene fluoride copolymers; polycarbonate resins such as polycarbonate; polyimide resins such as thermoplastic polyimides, polyamideimides and polyetherimides; thermoplastic polyurethane resins; and polyamide resins such as polyamide 6, polyamide 66, polyamide 46, polyamide 610, polyamide 612, polyamide 11, polyamide 12, polymetaxylylene adipamide (MXD6), polyhexamethylene terephthalamide (PA6T), polynonamethylene terephthalamide (PA9T), polydecamethylene terephthalamide (PA10T), polydodecamethylene terephthalamide (PA12T), polybis(4-aminocyclohexyl)methane dodecamide (PACM12), and polyamide raw material monomers to compose these and/or copolymers using several kinds of the above-mentioned polyamide raw material monomers. Two or more thereof may be contained in multi-layer molded products.

The semi-aromatic polyamide resin composition of the present invention can be suitably used for various molded products such as injection molded products and extrusion molded products. Further, since the semi-aromatic polyamide resin composition of the present invention is not only excellent in heat shock resistance but also excellent in the performance such as mechanical strength, heat resistance, and chemical resistance, the molded products formed of the semi-aromatic polyamide resin composition of the present invention or a polyamide resin composition containing the same can be used in wide applications such as electric and electronic materials, automotive parts, electric vehicle parts, a fuel cell vehicle parts, industrial materials, engineering materials, and household goods. The molded products can be particularly suitably used as parts for automobiles, electric vehicles, and fuel cell vehicles.

EXAMPLES

With reference to Examples, the present invention is more specifically described as follows. The present invention, however, is not limited thereto. In the Examples, various physical properties were each measured by the following methods.

A. Various Analysis Methods

In the following Examples, Comparative Examples, and the like, various components were analyzed by the following methods.

<Intrinsic Viscosity [η]>

The intrinsic viscosity [η] of the semi-aromatic polyamide resin (A) was measured in 96.5% sulfuric acid at 25° C. using an Ubbelohde viscometer as measuring apparatus. Specifically, about 0.5 g of the semi-aromatic polyamide resin (A) was dissolved in 50 ml of 96.5% concentrated sulfuric acid. The flowing time of the resultant solution at 25° C.±0.05° C. was measured using an Ubbelohde viscometer, and the intrinsic viscosity was calculated based on the following equation:

$$[\eta]=\eta SP/(C(1+0.205\eta SP)).$$

[η]: intrinsic viscosity (dl/g)
ηSP: specific viscosity
C: sample concentration (g/dl)
t: flowing time of sample solution (second)
t0: flowing time of blank sulfuric acid (second)
ηSP=(t−t0)/t0

<Melting Point (Tm) and Glass Transition Temperature (Tg)>

The melting point (Tm) of the semi-aromatic polyamide resin (A) was measured using a differential scanning calorimeter (DSC220C, manufactured by Seiko Instruments Inc.) as measuring apparatus. Specifically, about 5 mg of the semi-aromatic polyamide resin (A) was sealed in a measurement aluminum pan and heated to 330° C. at 10° C./min from room temperature. In order to completely melt the semi-aromatic polyamide resin (A), the temperature was maintained at 330° C. for 5 minutes, and then cooled to 30° C. at 10° C./min. Then, after the temperature was maintained at 30° C. for 5 minutes, a second heating was performed to 330° C. at 10° C./min. In the second heating, the peak temperature (° C.) was determined to be as the melting point (Tm) of the semi-aromatic polyamide resin (A), and the displacement point corresponding to glass transition as the glass transition temperature (Tg).

<Melt Flow Rate (MFR)>

The melt flow rate (MFR) of the acid-modified polyolefin resin (B) was measured at 190° C. with a load of 2.16 kg in accordance with ASTM D1238. The unit for MFR is g/10 min.

<Density>

The density of the acid-modified polyolefin resin (B) was measured at 23° C., using a density gradient tube in accordance with JIS K7112. The density was measured at 23° C., using a density gradient tube in accordance with JIS K7112.

<Vicat Softening Point>

The Vicat softening point of a sample piece (12.5 mm (width)×120 mm (length)×3 mm (thickness)) of the acid-modified polyolefin resin (B) made by injection molding with a cylinder at a temperature of the melting point (Tm) of the acid-modified polyolefin resin (B)+10° C. was measured by A50 method in accordance with ASTMD1525.

<Composition>

The amount (mass %) of the acid-modified polyolefin resin (B) in a resin composition, the composition of an olefin polymer skeleton, and the amount (mass %) of acid group-containing structural units were measured by $^{13}$C-NMR. The measurement conditions were as follows:

—Conditions—

Measurement apparatus: nuclear magnetic resonance apparatus (ECP500, manufactured by JEOL Ltd.)
Observing nucleus: $^{13}$C (125 MHz)
Sequence: single pulse proton decoupling
Pulse width: 4.7 μseconds (45° pulse)
Repetition time: 5.5 seconds
Cumulative number: 10,000 or more
Solvent: mixture solvent of o-dichlorobenzene/deuterated benzene (volume ratio: 80/20)
Sample concentration: 55 mg/0.6 mL
Measurement temperature: 120° C.
Reference value of chemical shift: 27.50 ppm B. Manufacturing of Semi-Aromatic Polyamide Resin (A) and Acid-Modified Polyolefin Resin (B)

Semi-aromatic polyamide resins (A) ((A-1) to (A-5)), and acid-modified polyolefin resins (B) ((B-1) to (B-4)) were prepared as follows.

Synthesis Example 1

Preparation of Semi-aromatic Polyamide Resin (A-1)

A 1-liter reactor was charged with 1,312 g (11.3 mol) of 1,6-diaminohexane, 1,312 g (11.3 mol) of 2-methyl-1,5-diaminopentane, 3,655 g (22.0 mol) of terephthalic acid, 5.5 g (5.2×10$^{-2}$ mol) of sodium hypophosphite as a catalyst, and 640 ml of ion exchange water, and after purging with nitrogen, a reaction was performed under conditions at 250° C. and kg/cm$^2$ for 1 hour. The molar ratio between 1,6-diaminohexane and 2-methyl-1,5-diaminopentane was set at 50:50. After the lapse of 1 hour, the reaction product produced in the reactor was withdrawn into a receiver connected to the reactor, at a pressure lower by about 10 kg/cm$^2$, so as to obtain a polyamide precursor having an intrinsic viscosity [η] of 0.15 dl/g.

Subsequently, the polyamide precursor was dried and subjected to melt polymerization using a biaxial extruder at a cylinder preset temperature of 330° C., so as to obtain semi-aromatic polyamide resin (A-1). The composition of semi-aromatic polyamide resin (A-1) is as follows.

In the diamine component units, the content of 1,6-diaminohexane component unit was 50 mol % and the content of 2-methyl-1,5-diaminopentane component unit was 50 mol %. The thus prepared polyamide resin had an intrinsic viscosity [η] of 1.0 dl/g, a melting point of 300° C., and a glass transition temperature of 140° C. The results obtained are summarized in Table 1.

Synthesis Example 2

Preparation of Semi-aromatic Polyamide Resin (A-2)

An autoclave having an internal capacity of 13.6 L was charged with 1,787 g (10.8 mol) of terephthalic acid, 2,800 g (24.1 mol) of 1,6-hexanediamine, 1,921 g (13.1 mol) of adipic acid, 5.7 g of sodium hypophosphite monohydrate, and 554 g of distilled water, and then the autoclave was purged with nitrogen. Reaction was initiated by starting the agitation at 190° C., and elevating the internal temperature of the autoclave to 250° C. over 3 hours. At this time, the internal pressure of the autoclave was increased to 3.01 MPa. The reaction was continued for 1 hour and then the air was discharged to the atmosphere from a spray nozzle disposed at the bottom of the autoclave so as to withdraw a low-condensation product.

The low-condensation product was then cooled to room temperature, ground to a particle size of 1.5 mm or less by a crusher, and dried at 110° C. for 24 hours. The resultant low-condensation product had a moisture content of 3,600 ppm and an intrinsic viscosity [η] of 0.14 dl/g. Subsequently, the low-condensation product was charged into a shelf-type solid-phase polymerization apparatus, and after purging with nitrogen, the temperature was elevated to 220° C. over about 1 hour and 30 minutes to start a reaction. The reaction was continued for 1 hour, and then the temperature was cooled to room temperature. The resultant compound had an intrinsic viscosity [η] of 0.48 dl/g.

Semi-aromatic polyamide resin (A-2) was then prepared by melt polymerization using a biaxial extruder with a screw diameter of 30 mm and an L/D of 36, at a barrel preset temperature of 330° C., a screw rotation speed of 200 rpm, and a resin feed rate of 6 kg/h. The thus prepared semi-aromatic polyamide resin (A-2) had an intrinsic viscosity [η] of 1.0 dl/g, a melting point Tm of 310° C., and a glass transition temperature of 85° C. The results obtained are summarized in Table 1.

Synthesis Example 3

Preparation of Semi-aromatic Polyamide Resin (A-3)

An autoclave having an internal capacity of 13.6 L was charged with 2,800 g (24.3 mol) of 1,6-diaminohexane, 2,774 g (16.7 mol) of terephthalic acid, 1,196 g (7.2 mol) of isophthalic acid, 36.6 g (0.3 mol) of benzoic acid, 5.7 g of sodium hypophosphite monohydrate, and 545 g of distilled water, and then the autoclave was purged with nitrogen. Reaction was initiated by starting the agitation at 190° C., and elevating the internal temperature of the autoclave to 250° C. over 3 hours. At this time, the internal pressure of the autoclave was increased to 3.03 MPa. The reaction was continued for 1 hour and then the air was discharged to the atmosphere from a spray nozzle disposed at the bottom of the autoclave so as to withdraw a low-condensation product. The low-condensation product was then cooled to room temperature, ground to a particle size of 1.5 mm or less by a crusher, and dried at 110° C. for 24 hours. The resultant low-condensation product had a moisture content of 4,100 ppm and an intrinsic viscosity [η] of 0.15 dl/g. Subsequently, the low-condensation product was charged into a shelf-type solid-phase polymerization apparatus, and after purging with nitrogen, the temperature was elevated to 180° C. over about 1 hour and 30 minutes to start a reaction. The reaction was continued for 1 hour and 30 minutes, and then the temperature was cooled to room temperature. The resultant compound had an intrinsic viscosity [η] of 0.20 dl/g.

Semi-aromatic polyamide resin (A-3) was then prepared by melt polymerization using a biaxial extruder with a screw diameter of 30 mm and an L/D of 36, at a barrel preset temperature of 330° C., a screw rotation speed of 200 rpm, and a resin feed rate of 6 Kg/h. The thus prepared polyamide resin had an intrinsic viscosity [η] of 1.0 dl/g, a melting point Tm of 330° C., and a glass transition temperature of 125° C. The results obtained are summarized in Table 1.

Synthesis Example 4

Preparation of Semi-aromatic Polyamide Resin (A-4)

An autoclave having an internal capacity of 20 liters was charged with 4,537.7 g (27.3 mol) of terephthalic acid, 4,385 g (27.7 mol) of a mixture of 1,9-nonanediamine and 2-methyl-1,8-octanediamine [1,9-nonanediamine/2-methyl-1,8-octanediamine=80/20 (molar ratio)], 9.12 g (0.1 mass % relative to the total mass of raw material) of sodium hypophosphite monohydrate, and 2.5 liters of distilled water, and then the autoclave was purged with nitrogen. The mixture was agitated at 100° C. for 30 minutes, and the internal temperature of the autoclave was elevated to 220° C. over 2 hours. At this time, the internal pressure of the autoclave was increased to 2 MPa. The reaction was continued for 2 hours and then the temperature was elevated to 230° C. and maintained at 230° C. for 2 hours for the reaction to proceed while steam was gradually withdrawn with the pressure maintained at 2 MPa. Subsequently the pressure was reduced to 1 MPa over 30 minutes, and the reaction was continued for further 1 hour so as to obtain a prepolymer having an intrinsic viscosity [η] of 0.15 dl/g. The prepolymer was dried at 100° C. under reduced pressure for 12 hours and ground to a particle size of 2 mm or less. The resultant prepolymer was subjected to solid phase polymerization at 230° C. and 13 Pa (0.1 mmHg) for 10 hours so as to prepare a semi-aromatic polyamide resin (A-4). The thus prepared semi-aromatic polyamide resin (A-4) had an intrinsic viscosity [η] of 1.2 dl/g, a melting point Tm of 300° C., and a glass transition temperature of 120° C. The results obtained are summarized in Table 1.

Synthesis Example 5

Preparation of Semi-aromatic Polyamide Resin (A-5)

A 1-liter reactor was charged with 1,289 g (11.1 mol) of 1,6-diaminohexane, 1,289 g (11.0 mol) of 2-methyl-1,5-diaminopentane, 3,655 g (22.0 mol) of terephthalic acid, 5.5 g ($5.2 \times 10^{-2}$ mol) of sodium hypophosphite as a catalyst, and 640 ml of ion exchange water, and after purging with nitrogen, a reaction was performed under conditions at 250° C. and kg/cm² for 1 hour. The molar ratio between 1,6-diaminohexane and 2-methyl-1,5-diaminopentane was set at 50:50. After the lapse of 1 hour, the reaction product produced in the reactor was withdrawn into a receiver connected to the reactor, at a pressure lower by about 10 kg/cm², so as to obtain a polyamide precursor having an intrinsic viscosity [η] of 0.15 dl/g.

Subsequently, the polyamide precursor was dried and subjected to melt polymerization using a biaxial extruder at a cylinder preset temperature of 330° C., so as to obtain a semi-aromatic polyamide resin (A-5). The composition of the semi-aromatic polyamide resin (A-5) is as follows.

In the diamine component units, the content of 1,6-diaminohexane component unit was 50 mol % and the content of 2-methyl-1,5-diaminopentane component unit was 50 mol %. The thus prepared polyamide resin had an intrinsic viscosity [η] of 1.0 dl/g, a melting point Tm of 300° C., and a glass transition temperature of 138° C. The results obtained are summarized in Table 1.

TABLE 1

| | | | Semi-aromatic polyamide resin (A) | | | | |
|---|---|---|---|---|---|---|---|
| | | | A-1 | A-2 | A-3 | A-4 | A-5 |
| Polyamide component unit (a) | | | | | | | |
| Composition | 1,6-Diaminohexane | [mol %] | 50 | 100 | 100 | — | 50 |
| | 2-Methyl-1,5-pentanediamine | [mol %] | 50 | — | — | — | 50 |
| | 1,9-Nonanediamine | [mol %] | — | — | — | 80 | — |
| | 2-Methyl-1,8-octanediamine | [mol %] | — | — | — | 20 | — |

TABLE 1-continued

|  |  |  | Semi-aromatic polyamide resin (A) | | | | |
|---|---|---|---|---|---|---|---|
|  |  |  | A-1 | A-2 | A-3 | A-4 | A-5 |
|  | Dicarboxylic acid component (b) | | | | | | |
|  | Terephthalic acid | [mol %] | 100 | 55 | 70 | 100 | 100 |
|  | Isophthalic acid | [mol %] | — | — | 30 | — | — |
|  | Adipic acid | [mol %] | — | 45 | — | — | — |
|  | Amount of terminal amino group | [mmol/kg] | 102 | 40 | 80 | 68 | 50 |
| Physical | Intrinsic viscosity [η] | dl · g$^{-1}$ | 1.0 | 1.0 | 1.0 | 1.2 | 1.0 |
| properties | Melting point | ° C. | 300 | 310 | 330 | 300 | 300 |
|  | Glass transition temperature (Tg) | ° C. | 140 | 85 | 125 | 120 | 138 |

Synthesis Example 6

Preparation of Acid-modified Polyolefin Resin (B-1)

One hundred parts by mass of a high-density polyethylene [density: 0.95, MFR=5 g/10 min], 0.8 parts by mass of maleic anhydride, and 0.07 parts by mass of an organic peroxide [PERHEXYNE-25B, manufactured by NOF Corporation] were mixed in a henschel mixer and the resultant mixture was subjected to melt graft modification using a monoaxial extruder with a diameter of 65 mm at a preset temperature of 230° C., so as to obtain a graft-modified polyethylene.

The graft-modified polyethylene had a graft amount of maleic anhydride of 0.7 mass %. The results obtained are summarized in Table 2.

Synthesis Example 7

Preparation of Acid-modified Polyolefin Resin (B-2)

One hundred parts by mass of a linear low-density polyethylene [density: 0.92, MFR=4 g/10 min], 1.0 part by mass of maleic anhydride, and 0.07 parts by weight of an organic peroxide [PERHEXYNE-25B, manufactured by NOF Corporation] were mixed in a henschel mixer and the resultant mixture was subjected to melt graft modification using a monoaxial extruder with a diameter of 65 mm at a preset temperature of 230° C., so as to obtain a graft modified polyethylene.

The graft-modified polyethylene had a graft amount of maleic anhydride of 0.9 mass %. The results obtained are summarized in Table 2.

Synthesis Example 8

Preparation of Acid-modified Polyolefin Resin (B-3)

A glass flask fully purged with nitrogen was charged with 0.63 mg of bis(1,3-dimethyl-cyclopentadienyl)zirconium dichloride, and then with 1.57 ml of a toluene solution of methylaluminoxane (Al: 0.13 mmol/liter) and 2.43 ml of toluene to obtain a catalyst solution.

Next, a stainless steel autoclave having an internal capacity of 2 liters was fully purged with nitrogen and charged with 912 ml of hexane and 320 ml of 1-butene, and the temperature of the autoclave was elevated to 80° C. Subsequently, 0.9 mmol of triisobutylaluminum and 2.0 ml (0.0005 mmol in terms of Zr) of the prepared catalyst solution were injected into the autoclave using ethylene to start the polymerization reaction. Ethylene was continuously supplied to maintain the total pressure at 8.0 kg/cm$^2$-G, and the polymerization was performed at 80° C. for 30 minutes.

After terminating the polymerization reaction by introducing a small amount of ethanol into the system, the unreacted ethylene was purged. A white solid was precipitated by feeding the resultant solution into a large excess amount of methanol. The white solid was collected by filtration and dried overnight under reduced pressure to obtain a white solid (ethylene-1-butene copolymer) (density: 0.87 g/cm$^3$, MFR (ASTMD1238 standard, at 190° C., load: 2.16 kg): 0.7 g/10 minutes, 1-butene structural unit content: 4 mol %). The resultant ethylene-1-butene copolymer in an amount of 100 parts by mass was mixed with 1.0 part by mass of maleic anhydride and 0.04 parts by mass of a peroxide (PERHEXYNE 25B, trademark, manufactured by NOF Corporation). The resultant mixture was subjected to melt graft modification in a monoaxial extruder at a preset temperature of 230° C. to obtain an acid-modified ethylene-1-butene copolymer. The amount of the maleic anhydride graft modification was 0.9 mass %. The results obtained are summarized in Table 2.

Synthesis Example 9

Preparation of Acid-modified Polyolefin Resin (B-4)

Acid-modified polyolefin resin (B-4) was prepared in the same manner as for the acid-modified polyolefin resin (B-3) except that the comonomer in manufacturing of the acid-modified polyolefin resin (B-3) was changed to 1-octene. The amount of maleic anhydride graft modification was 0.87 mass %. The results obtained are summarized in Table 2.

TABLE 2

|  |  |  | Acid-modified polyolefin resin (B) | | | |
|---|---|---|---|---|---|---|
|  |  |  | B-1 | B-2 | B-3 | B-4 |
| Composition | α-Olefin | Type | — | 1-Hexene | 1-Butene | 1-Octene |
|  | Ethylene | [mol %] | 100 | 90 | 80 | 80 |
|  | α-Olefin (molar ratio) | [mol %] | 0 | 10 | 20 | 20 |
|  | Amount of maleic acid modification | [wt %] | 0.99 | 0.98 | 0.98 | 0.99 |

TABLE 2-continued

|  |  |  | Acid-modified polyolefin resin (B) | | | |
|---|---|---|---|---|---|---|
|  |  |  | B-1 | B-2 | B-3 | B-4 |
| Physical properties | Vicat softening point | ° C. | 126 | 98 | 40 | 42 |
|  | MFR | [g · 10 min$^{-1}$] | 5.0 | 4.0 | 1.2 | 1.6 |
|  | Density | [g/cm$^3$] | 0.95 | 0.92 | 0.87 | 0.87 |

Example 1

Using a tumbler blender, 64 mass % of semi-aromatic polyamide resin (A-1), 5 mass % of acid-modified polyolefin resin (B-2), 1 mass % of a heat aging resistant agent were mixed and melt kneaded in a biaxial extruder (TEX30α, manufactured by The Japan Steel Works, Ltd.) at a cylinder temperature of melting point (Tm) of semi-aromatic polyamide resin (A)+15° C., to which 30 mass % of glass fiber (manufactured by Owens Corning Corp.) was further added from an arbitrary position of the biaxial extruder so as to be melt kneaded. The kneaded product was then extruded in a strand shape and cooled in a water bath. Then, the strand was fed into a pelletizer to cut and obtain pellets of the resin composition of the present invention. As a result of the DSC measurement of the obtained pellet performed in the same manner as for the semi-aromatic polyamide resin (A), Tg derived from the semi-aromatic polyamide resin (A) in this Example was 138° C. The pellet resin composition obtained was subjected to the tests below. The results obtained are summarized in Table 3.

Example 2

Pellets of the resin composition of the present invention in Example 2 were prepared in the same manner as in Example 1, except that 59 mass % of the semi-aromatic polyamide resin (A-1), 10 mass % of the acid-modified polyolefin resin (B-2), 30 mass % of glass fiber (manufactured by Owens Corning Corp.), and 1 mass % of a heat aging resistant agent were mixed using a tumbler blender. As a result of the DSC measurement of the obtained pellet performed in the same manner as for the semi-aromatic polyamide resin (A), Tg derived from the semi-aromatic polyamide resin (A) in this Example was 138° C. The pellet resin composition obtained was subjected to the tests below. The results obtained are summarized in Table 3. The result of the LFM measurement of the resin composition is shown in FIG. 1.

Example 3

Pellets of the resin composition of the present invention in Example 3 were prepared in the same manner as in Example 1, except that 49 mass % of semi-aromatic polyamide resin (A-1), 20 mass % of acid-modified polyolefin resin (B-2), 30 mass % of glass fiber (manufactured by Owens Corning Corp.), and 1 mass % of a heat aging resistant agent were mixed using a tumbler blender. As a result of the DSC measurement of the obtained pellet performed in the same manner as for the semi-aromatic polyamide resin (A), Tg derived from the semi-aromatic polyamide resin (A) in this Example was 139° C. The pellet resin composition obtained was subjected to the tests below. The results obtained are summarized in Table 3.

Example 4

Figure 2:
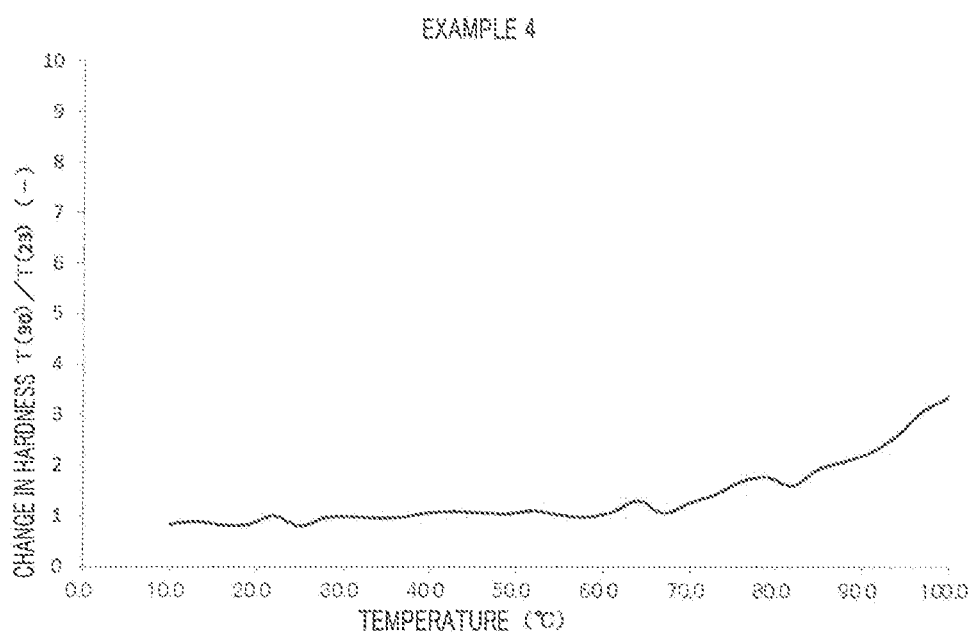
FIG. 2 is a chart showing the results in Example 4 measured by a lateral force microscope (LFM)

Pellets of the resin composition of the present invention in Example 4 were prepared in the same manner as in Example 1, except that 59 mass % of the semi-aromatic polyamide resin (A-1), 7 mass % of the acid-modified polyolefin resin (B-2), 3 mass % of the acid-modified polyolefin resin (B-3), 30 mass % of glass fiber (manufactured by Owens Corning Corp.), and 1 mass % of a heat aging resistant agent were mixed using a tumbler blender. As a result of the DSC measurement of the obtained pellet performed in the same manner as for the semi-aromatic polyamide resin (A), Tg derived from the semi-aromatic polyamide resin (A) in this Example was 138° C. The pellet resin composition obtained was subjected to the tests below. The results obtained are summarized in Table 3. The result of the LFM measurement of the resin composition is shown in FIG. 2.

Example 5

Pellets of the resin composition of the present invention in Example 5 were prepared in the same manner as in Example 1, except that 59 mass % of the semi-aromatic polyamide resin (A-4), 10 mass % of the acid-modified polyolefin resin (B-2), 30 mass % of glass fiber (manufactured by Owens Corning Corp.), and 1 mass % of a heat aging resistant agent were mixed using a tumbler blender. As a result of the DSC measurement of the obtained pellet performed in the same manner as for the semi-aromatic polyamide resin (A), Tg derived from the semi-aromatic polyamide resin (A) in this Example was 119° C. The pellet resin composition obtained was subjected to the tests below. The results obtained are summarized in Table 3.

Comparative Example 1

Pellets of the resin composition in Comparative Example 1 were prepared in the same manner as in Example 1, except that 69 mass % of the semi-aromatic polyamide resin (A-1), 30 mass % of glass fiber (manufactured by Owens Corning Corp.), and 1 mass % of a heat aging resistant agent were mixed using a tumbler blender. As a result of the DSC measurement of the obtained pellet performed in the same manner as for the semi-aromatic polyamide resin (A), Tg derived from the semi-aromatic polyamide resin (A) in this Comparative Example was 139° C. The pellet resin composition obtained was subjected to the tests below. The results obtained are summarized in Table 3.

Comparative Example 2

Pellets of the resin composition in Comparative Example 2 were prepared in the same manner as in Example 1, except that 44 mass % of the semi-aromatic polyamide resin (A-1), 25 mass % of the acid-modified polyolefin resin (B-2), 30 mass % of glass fiber (manufactured by Owens Corning Corp.), and 1 mass % of a heat aging resistant agent were mixed using a tumbler blender. As a result of the DSC measurement of the obtained pellet performed in the same manner as for the semi-aromatic polyamide resin (A), Tg derived from the semi-aromatic polyamide resin (A) in this Comparative Example was 136° C. The pellet resin composition obtained was subjected to the tests below. The results obtained are summarized in Table 3.

Comparative Example 3

Pellets of the resin composition in Comparative Example 3 were prepared in the same manner as in Example 2, except that the semi-aromatic polyamide resin (A-1) was replaced with (A-2). As a result of the DSC measurement of the obtained pellet performed in the same manner as for the semi-aromatic polyamide resin (A), Tg derived from the semi-aromatic polyamide resin (A) in this Comparative Example was 85° C. The pellet resin composition obtained was subjected to the tests below. The results obtained are summarized in Table 3.

Example 6

Pellets of the resin composition in Example 6 were prepared in the same manner as in Example 2, except that semi-aromatic polyamide resin (A-1) was replaced with (A-3). As a result of the DSC measurement of the obtained pellet performed in the same manner as for the semi-aromatic polyamide resin (A), Tg derived from the semi-aromatic polyamide resin (A) in this Example was 125° C. The pellet resin composition obtained was subjected to the tests below. The results obtained are summarized in Table 3.

Comparative Example 4

Pellets of the resin composition in Comparative Example 4 were prepared in the same manner as in Example 2, except that the acid-modified polyolefin resin (B-2) was replaced with (B-1). As a result of the DSC measurement of the obtained pellet performed in the same manner as for the semi-aromatic polyamide resin (A), Tg derived from the semi-aromatic polyamide resin (A) in this Comparative Example was 139° C. The pellet resin composition obtained was subjected to the tests below. The results obtained are summarized in Table 3.

Comparative Example 5

Figure 3:
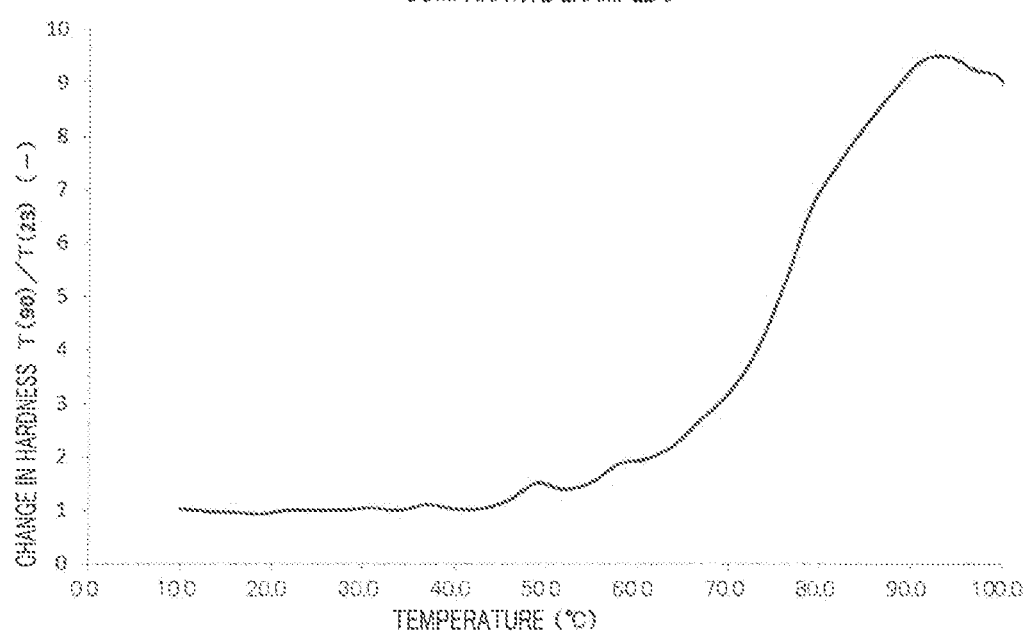
FIG. 3 is a chart showing the results in Comparative Example 5 measured by a lateral force microscope (LFM).

Pellets of the resin composition in Comparative Example 5 were prepared in the same manner as in Example 2, except that acid-modified polyolefin resin (B-2) was replaced with (B-3). As a result of the DSC measurement of the obtained pellet performed in the same manner as for the semi-aromatic polyamide resin (A), Tg derived from the semi-aromatic polyamide resin (A) in this Comparative Example was 138° C. The pellet resin composition obtained was subjected to the tests below. The results obtained are summarized in Table 3. The result of the LFM measurement of the resin composition is shown in FIG. 3.

Comparative Example 6

Pellets of the resin composition in Comparative Example 6 were prepared in the same manner as in Example 2, except that the acid-modified polyolefin resin (B-2) was replaced with (B-4). As a result of the DSC measurement of the obtained pellet performed in the same manner as for the semi-aromatic polyamide resin (A), Tg derived from the semi-aromatic polyamide resin (A) in this Comparative Example was 138° C. The pellet resin composition obtained was subjected to the tests below. The results obtained are summarized in Table 3.

Example 7

Pellets of the resin composition in Example 7 were prepared in the same manner as in Example 1, except that 64 mass % of the semi-aromatic polyamide resin (A-5), 5 mass % of the acid-modified polyolefin resin (B-2), 30 mass % of glass fiber (manufactured by Owens Corning Corp.), and 1 mass % of a heat aging resistant agent were mixed using a tumbler blender. As a result of the DSC measurement of the obtained pellet performed in the same manner as for the semi-aromatic polyamide resin (A), Tg derived from the semi-aromatic polyamide resin (A) in this Example was 138° C. The pellet resin composition obtained was subjected to the tests below. The results obtained are summarized in Table 3.

[Evaluation]

The pellet resin compositions obtained in the Examples and the Comparative Examples were each evaluated by the following methods.

(Tensile Strength)

Regarding each resin composition prepared by the above method, an ASTM-1 (dumbbell piece) sample piece having a thickness of 3 mm prepared using the below-mentioned injection molding machine under the below-mentioned molding conditions was allowed to stand in a nitrogen atmosphere at 23° C. for 24 hours. The sample piece was then subjected to a tensile test in an atmosphere at a temperature of 23° C. and a relative humidity of 50% to measure the tensile strength.

Molding machine: TUPARL TR40S3A manufactured by Sodick Plustech Co., Ltd.

Molding machine cylinder temperature: melting point (Tm) of semi-aromatic polyamide resin (A)+15° C.

Mold temperature: Tg of semi-aromatic polyamide resin (A)+20° C.

(Bending Test (Flexural Modulus and Flexural Strength))

A sample piece having a thickness of 3.2 mm was prepared using the below-mentioned injection molding machine under the below-mentioned molding conditions and allowed to stand in a nitrogen atmosphere at 23° C. for 24 hours. The sample piece was subjected to a bending test in an atmosphere at 23° C. and a relative humidity of 50%, using a bending tester AB5 manufactured by NTESCO, with a span of 51 mm, a bending speed of 12.7 mm/min to measure the flexural strength and the modulus of elasticity.

Molding machine: TUPARL TR40S3A manufactured by Sodick Plustech Co., Ltd.

Molding machine cylinder temperature: melting point (Tm) of semi-aromatic polyamide resin (A)+15° C.

Mold temperature: 160° C.

(IZOD Impact Strength)

Using the below-mentioned injection molding machine, a sample piece with a notch having a thickness of 3.2 mm was prepared under the below-mentioned molding conditions. The IZOD impact strength of the sample piece was measured in an atmosphere at a temperature of 23° C. and a relative humidity of 50% and in an atmosphere at a temperature of −40° C. and a relative humidity of 50% in accordance with ASTMD256.

Molding machine: SE50DU manufactured by Sumitomo Heavy Industries, Ltd.

Molding machine cylinder temperature: melting point (Tm) of semi-aromatic polyamide resin (A)+15° C.

Mold temperature: Tg of semi-aromatic polyamide resin (A)+20° C.

(Change in Hardness by Lateral Force Microscope (LFM))

Specific measurement conditions are as follows.

Model: Environmental control probe microscope NANONAVI/E-SWEEP (Hitachi High-Tech Science Corporation)

Cantilever: OMCL-RC800PB (Spring constant): 0.11 N/m (Olympus Corporation)

Measurement environment: under high vacuum ($1.0 \times 10^{-4}$ Pa or less)

Load during measurement: 4 nN

Temperature elevation rate: 3° C./min

Measurement temperature range: 10° C. to 121° C.

The measurement was performed by the following methods (1) to (4).

(1) Preparation Method of Sample for LFM

Using the below-mentioned injection molding machine, a sample piece of each of the resin compositions was made under the below-mentioned conditions. Each of the sample pieces had a length of 90 mm, a width of 48 mm, and a thickness of 3 mm, and from the sample piece, a sample piece having a length of 10 mm, a width of 10 mm, and a thickness of 3 mm was cut out for use in LFM.

Molding machine: SG50, manufactured by Sumitomo Heavy Industries, Ltd.

Molding machine cylinder temperature: melting point (Tm) of semi-aromatic polyamide resin (A)+15° C.

Mold temperature: Tg of semi-aromatic polyamide resin (A)+20° C.

(2) Under high vacuum conditions ($1.0 \times 10^{-4}$ Pa or less), the cantilever probe (spring constant: 0.1 N/m) of a lateral force microscope (environmental control probe microscope NANONAVI/E-SWEEP, manufactured by Hitachi High-Tech Science Corporation) was pressed onto the above-mentioned sample with a load of 4 nN, and reciprocated in parallel with the film surface, in the direction perpendicular to the cantilever direction, with an amplitude of 1 μm at a cycle of 0.5 Hz. On this occasion, the values (lateral force) calculated from the amount of twist of the cantilever were measured at intervals of 1° C. in the temperature range of 10° C. to 121° C.

(3) The frictional force obtained in the above (2) was plotted against the temperature.

(4) From the observation of the plotted force in the above (3), the ratio between the frictional force T(23) at 23° C. and the frictional force T(90) at 90° C., i.e. (T(23)/T(90)), was obtained as the index of the change in hardness.

(Amount of Terminal Amino Group of Semi-aromatic Polyamide Resin (A) Contained in Resin Composition)

Each of the semi-aromatic polyamide resins (A) in an amount of 1 g was dissolved in 35 mL of phenol, which was mixed with 2 mL of methanol to make a sample solution. Then, using thymol blue as an indicator, the sample solution was titrated with 0.01 N HCl aqueous solution to determine the amount of the terminal amino group ([$NH_2$], unit: mmol/kg). From the product of the amount of the terminal amino group and the mass of the semi-aromatic polyamide resin (A) contained in each of the resin compositions, the amount (mol) of the terminal amino group contained in the resin composition was obtained.

(Amount of Acid Group and Derivative Group Thereof of Acid-modified Polyolefin Resin (B) Contained in Resin Composition)

The pellet of the acid-modified polyolefin resin (B) in an amount of 5 g was dissolved in 170 mL of toluene, which was mixed with 30 mL of methanol to prepare a sample solution. Then, using phenolphthalein as an indicator, the sample solution was titrated with 0.1 N KOH ethanol solution to determine the total amount (unit: mmol/kg) of the acid group and the derivative group thereof of the acid-modified polyolefin resin (B). From the product of the total amount of the acid group and the derivative group thereof and the mass of the acid-modified polyolefin resin (B) contained in each of the resin compositions, the total amount (mol) of the acid group and the derivative group thereof of the acid-modified polyolefin resin (B) contained in the resin composition was obtained.

(Volume Resistivity)

Using the below-mentioned injection molding machine, a sample piece of each of the resin compositions was made under the below-mentioned conditions. Each of the sample pieces had a length of 90 mm, a width of 48 mm, and a thickness of 3 mm, and from the sample piece, a sample piece having a length of 10 mm, a width of 10 mm, and a thickness of 3 mm was cut out for evaluation of the volume resistivity.

Molding machine: SG50, manufactured by Sumitomo Heavy Industries, Ltd.

Molding machine cylinder temperature: melting point (Tm) of semi-aromatic polyamide resin (A)+15° C.

Mold temperature: Tg of semi-aromatic polyamide resin (A)+20° C.

The resistivity of the thus prepared sample piece was measured by the double ring electrode method in accordance with ASTM D257: 2007, using a model 8340A manufactured by ADC Corporation.

(Heat Shock Resistance)

Using the below-mentioned injection molding machine, a sample piece of each of the resin compositions was made under the below-mentioned conditions. The sample piece with a junction between resins (welded part) at the center had a thickness of 3.2 mm.

Molding machine: injection molding machine TUPARL TR40S3A (manufactured by Sodick Plustech Co., Ltd.)

Molding machine cylinder temperature: melting point (Tm) of semi-aromatic polyamide resin (A)+15° C.

Mold temperature: Tg of semi-aromatic polyamide resin (A)+20° C.

A test to leave the sample piece in an ATF oil controlled at 130° C. for 5 minutes and then in an ATF oil cooled to −40° C. for 5 minutes was repeated 100 times. The strength at the junction of the sample piece was then measured by the tensile test. The strength retention ratio (%) was obtained from the measurements before and after the test.

Strength retention ratio (%)=(tensile strength after test)/(initial tensile strength)×100

TABLE 3

| | | | Example | | | | | | |
|---|---|---|---|---|---|---|---|---|---|
| | | | 1 | 2 | 3 | 4 | 5 | 6 | 7 |
| Semi-aromatic polyamide resin (A) | Type | [—] | A-1 | A-1 | A-1 | A-1 | A-4 | A-3 | A-5 |
| | Amount to be blended | [mass %] | 64 | 59 | 49 | 59 | 59 | 59 | 64 |

TABLE 3-continued

| Acid-modified polyolefin resin (B) | Type | [—] | B-2 | B-2 | B-2 | B-2/B-3 | B-2 | B-2 | B-2 |
|---|---|---|---|---|---|---|---|---|---|
| | Amount to be blended | [mass %] | 5 | 10 | 20 | 7/3 (10) | 10 | 10 | 5 |
| Fibrous filler (C) | Amount to be blended | [mass %] | 30 | 30 | 30 | 30 | 30 | 30 | 30 |
| Heat aging resistant agent (D) | Amount to be blended | [mass %] | 1 | 1 | 1 | 1 | 1 | 1 | 1 |
| Terephthalic component amount in dicarboxylic acid of resin (A) | | [mol %] | 100 | 100 | 100 | 100 | 100 | 70 | 100 |
| Glass transition temperature derived from resin (A) | | ° C. | 138 | 138 | 139 | 138 | 119 | 125 | 138 |
| Vicat softening point of resin (B) | | ° C. | 98 | 98 | 98 | 80.6 | 98 | 98 | 98 |
| Tensile strength | | [MPa] | 188 | 162 | 150 | 168 | 165 | 170 | 178 |
| Flexural modulus | | [MPa] | 8050 | 7200 | 5500 | 7100 | 7000 | 9000 | 7990 |
| Change in hardness (T(23)/T(90)) | | [—] | 0.8 | 1.4 | 2 | 2.7 | 2.2 | 1.6 | 0.8 |
| IZOD impact strength | | [J · m$^{-1}$] 23° C. | 115 | 123 | 146 | 130 | 120 | 105 | 104 |
| IZOD impact strength | | [J · m$^{-1}$] −40° C. | 77 | 84 | 106 | 80 | 85 | 69 | 72 |
| Amount of terminal amino group [MA] | | [mol] | 6.53 | 6.02 | 5 | 6.02 | 8.4 | 8.59 | 3.2 |
| Amount of acid group and derivative group thereof [MB] | | [mol] | 0.46 | 0.92 | 1.84 | 0.92 | 0.92 | 0.92 | 0.46 |
| MA − MB | | [mol] | 6.07 | 5.1 | 3.16 | 5.1 | 7.48 | 7.67 | 2.74 |
| Volume resistivity | | [Ω · cm] | 1.4 × 10$^{14}$ | 1.1 × 10$^{14}$ | 1.0 × 10$^{14}$ | 0.8 × 10$^{14}$ | 1.0 × 10$^{14}$ | 1.4 × 10$^{14}$ | 1.4 × 10$^{14}$ |
| Heat shock resistance/Retention ratio of joint strength | | [%] | 97 | — | — | — | — | — | — |

| | | | Comparative Example | | | | | |
|---|---|---|---|---|---|---|---|---|
| | | | 1 | 2 | 3 | 4 | 5 | 6 |
| Semi-aromatic polyamide resin (A) | Type | [—] | A-1 | A-1 | A-2 | A-1 | A-1 | A-1 |
| | Amount to be blended | [mass %] | 69 | 44 | 59 | 59 | 59 | 59 |
| Acid-modified polyolefin resin (B) | Type | [—] | — | B-2 | B-2 | B-1 | B-3 | B-4 |
| | Amount to be blended | [mass %] | — | 25 | 10 | 10 | 10 | 10 |
| Fibrous filler (C) | Amount to be blended | [mass %] | 30 | 30 | 30 | 30 | 30 | 30 |
| Heat aging resistant agent (D) | Amount to be blended | [mass %] | 1 | 1 | 1 | 1 | 1 | 1 |
| Terephthalic component amount in dicarboxylic acid of resin (A) | | [mol %] | 100 | 100 | 55 | 100 | 100 | 100 |
| Glass transition temperature derived from resin (A) | | ° C. | 139 | 136 | 85 | 139 | 138 | 138 |
| Vicat softening point of resin (B) | | ° C. | — | 98 | 98 | 126 | 40 | 42 |
| Tensile strength | | [MPa] | 210 | 126 | 170 | 170 | 168 | 168 |
| Flexural modulus | | [MPa] | 8900 | 4660 | 7700 | 7500 | 6750 | 6700 |
| Change in hardness (T(23)/T(90)) | | [—] | 0.1 | 5.5 | >15 | 1 | 9.1 | 9.5 |
| IZOD impact strength | | [J · m$^{-1}$] 23° C. | 105 | 153 | 105 | 109 | 152 | 154 |
| IZOD impact strength | | [J · m$^{-1}$] −40° C. | 70 | 114 | 79 | 71 | 90 | 91 |
| Amount of terminal amino group [MA] | | [mol] | 7.04 | 4.49 | 2.37 | 6.02 | 6.02 | 6.02 |
| Amount of acid group and derivative group thereof [MB] | | [mol] | 0 | 2.3 | 0.92 | 0.71 | 0.92 | 0.89 |
| MA − MB | | [mol] | 7.04 | 2.19 | 1.45 | 5.31 | 5.1 | 5.13 |
| Volume resistivity | | [Ω · cm] | 3.4 × 10$^{14}$ | 9 × 10$^{12}$ | 1.4 × 10$^{10}$ | 1.4 × 10$^{14}$ | 1.1 × 10$^{10}$ | 0.9 × 10$^{10}$ |
| Heat shock resistance/Retention ratio of joint strength | | [%] | — | — | 91 | — | — | 93 |

Examples 1 to 7 with a combination of a specific semi-aromatic polyamide resin (A) and a specific acid-modified polyolefin resin (B) had excellent results in any of tensile strength, flexural modulus, IZOD impact strength, and ratio between frictional forces at 23° C. and 90° C. (change in hardness=T(23)/T(90)).

Here, as shown in Example 4, inclusion of 3 mass % of the acid-modified polyolefin resin (B-3) in the total resin composition in addition to the acid-modified polyolefin resin (B-2) resulted in sufficiently well-balanced performance data. The resin composition in Example 6 had a slightly small IZOD impact strength since the aliphatic diamine component of the semi-aromatic polyamide resin (A) has no side-chain alkylene diamine. It is presumed that the slightly low dispersibility of acid-modified polyolefin resin (B) caused difficulty in enhancing the IZOD impact strength. The tensile strength and the impact strength of the resin composition in Example 7 were slightly smaller than those in Example 1, due to the value of MA−MB less than 3.0.

The resin composition in Comparative Example 1 had small IZOD impact strength due to the absence of the acid-modified polyolefin resin (B). The resin composition in Comparative Example 2 had small tensile strength and small flexural modulus due to a large content of the acid-modified polyolefin resin (B). The resin composition in Comparative Example 3 had a large ratio between frictional force at 23° C. and frictional force at 90° C., or the large change in hardness, due to use of semi-aromatic polyamide resin (A) having a low glass transition temperature. The resin composition in Comparative Example 4 had low IZOD impact strength due to use of acid-modified polyolefin resin (B) having a high density. The resin compositions in Comparative Examples 5 and 6 had a large ratio between frictional force at 23° C. and frictional force at 90° C., or the large change in hardness, as shown in FIG. 3, due to use of acid-modified polyolefin resin (B) having a low density and a low Vicat softening point.

This application claims priority based on Japanese patent Application No. 2013-264388, filed on Dec. 20, 2013, the entire contents of which including the specification and the drawings are incorporated herein by reference.

INDUSTRIAL APPLICABILITY

The semi-aromatic polyamide resin composition of the present invention has high rigidity and impact resistance, excellent in heat shock resistance. The molded products formed of the semi-aromatic polyamide resin composition allow the strength of the junction between resins to be maintained, and can be therefore used in wide applications such as electric and electronic materials, automotive parts, industrial materials, engineering materials, and household goods, particularly suitably in application to automotive parts.

The invention claimed is:

1. A semi-aromatic polyamide resin composition comprising:
   a semi-aromatic polyamide resin (A) constituted from a dicarboxylic acid component unit and an aliphatic diamine component unit;
   an acid-modified polyolefin resin (B); and
   a fibrous filler (C);
   wherein
   the semi-aromatic polyamide resin (A) comprises 60 mol % or more of a terephthalic acid component unit relative to a total number of moles of the dicarboxylic acid component unit;
   the acid-modified polyolefin resin (B) is contained in an amount of 1.0 to 23 parts by mass relative to 100 parts by mass of a total of the semi-aromatic polyamide resin (A), the acid-modified polyolefin resin (B), and the fibrous filler (C);
   the semi-aromatic polyamide resin composition satisfies below requirement (1); and
   the acid-modified polyolefin resin (B) satisfies below requirement (2):
   (1) a glass transition temperature derived from the semi-aromatic polyamide resin (A) measured by DSC is in the range of 90° C. to 180° C.; and
   (2) a Vicat softening point measured in accordance with ASTM D1525 is in the range of 90° C. to 110° C.

2. The semi-aromatic polyamide resin composition according to claim 1, wherein a ratio between frictional force T(23) at 23° C. and frictional force T(90) at 90° C., i.e. (T(90)/T(23)), measured by a lateral force microscope (LFM) is 5 or less.

3. The semi-aromatic polyamide resin composition according to claim 1, wherein
   the acid-modified polyolefin resin (B) is an olefin polymer modified with an unsaturated carboxylic acid or a derivative thereof; and
   a total number of moles (MA) of terminal amino groups of the semi-aromatic polyamide resin (A) and a total number of moles (MB) of acid groups and derivative groups thereof in the acid-modified polyolefin resin (B) contained in the semi-aromatic polyamide resin composition satisfy below requirement (3):

$$(MA-MB) \geq 3.0. \tag{3}$$

4. The semi-aromatic polyamide resin composition according to claim 1, wherein the aliphatic diamine component unit of the semi-aromatic polyamide resin (A) satisfies at least one of below requirements (a1) and (a2):
   (a1) a content of a straight-chain alkylene diamine component unit having 4 to 18 carbon atoms relative to a total number of moles of the aliphatic diamine component unit is 40 to 90 mol %;
   (a2) a content of a side-chain alkylene diamine component unit having 4 to 18 carbon atoms relative to the total number of moles of the aliphatic diamine component unit is 10 to 60 mol %.

5. The semi-aromatic polyamide resin composition according to claim 4, wherein the side-chain alkylene diamine component unit comprises at least one of a 2-methyl-1,8-octanediamine component unit and a 2-methyl-1,5-pentanediamine component unit.

6. The semi-aromatic polyamide resin composition according to claim 4, wherein
   the straight-chain alkylene diamine component unit comprises a 1,6-diaminohexane component unit; and
   the side-chain alkylene diamine component unit comprises a 2-methyl-1,5-pentanediamine component unit.

7. The semi-aromatic polyamide resin composition according to claim 6, wherein the aliphatic diamine component unit comprises more than 45 mol % and less than 55 mol % of a 1,6-diaminohexane component unit and more than 45 mol % and less than 55 mol % of a 2-methyl-1,5-pentanediamine component unit.

8. The semi-aromatic polyamide resin composition according to claim 4, wherein the straight-chain alkylene diamine component unit comprises a 1,9-nonanediamine component unit, and the side-chain alkylene diamine component unit comprises a 2-methyl-1,8-octanediamine component unit.

9. The semi-aromatic polyamide resin composition according to claim 1, wherein
   the dicarboxylic acid component unit of the semi-aromatic polyamide resin (A) further comprises an isophthalic acid component unit; and
   the aliphatic diamine component unit of the semi-aromatic polyamide resin (A) has 4 to 15 carbon atoms.

10. The semi-aromatic polyamide resin composition according to claim 9, wherein
   the dicarboxylic acid component unit of the semi-aromatic polyamide resin (A) further comprises the isophthalic acid component unit and a molar ratio between the terephthalic acid component unit and the isophthalic acid component unit is 60/40 to 99.9/0.1; and
   the aliphatic diamine component unit comprises more than 45 mol % and less than 55 mol % of a 1,6-diaminohexane component unit and more than 45 mol % and less than 55 mol % of a 2-methyl-1,5-pentanediamine component unit.

11. The semi-aromatic polyamide resin composition according to claim 3, wherein the acid-modified polyolefin resin (B) satisfies below requirements (4) and (5):
   (4) a graft amount of the unsaturated carboxylic acid or the derivative thereof is 0.01 to 1.5 mass %; and
   (5) a density measured in accordance with JIS K7112 is in the range of 890 to 940 kg/m$^3$.

12. The semi-aromatic polyamide resin composition according to claim 1, wherein
   a content of the semi-aromatic polyamide resin (A) is 30 to 90 mass %,
   a content of the acid-modified polyolefin resin (B) is 1 to 20 mass %; and
   a content of the fibrous filler (C) is 5 to 60 mass %, wherein
   the total of the semi-aromatic polyamide resin (A), the acid-modified polyolefin resin (B), and the fibrous filler (C) is 100 mass %.

13. A molded product comprising the semi-aromatic polyamide resin composition according to claim 1.

* * * * *